United States Patent
Fan et al.

(10) Patent No.: US 10,440,731 B2
(45) Date of Patent: Oct. 8, 2019

(54) MISSION CRITICAL AND AUTONOMOUS UPLINK TRANSMISSION SUPPORT

(71) Applicant: QUALCOMM Incorporated, San Diego, CA (US)

(72) Inventors: Michael Mingxi Fan, San Diego, CA (US); Juan Montojo, San Diego, CA (US); Naga Bhushan, San Diego, CA (US); Aleksandar Damnjanovic, Del Mar, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 15/474,554

(22) Filed: Mar. 30, 2017

(65) Prior Publication Data

US 2018/0110063 A1    Apr. 19, 2018

Related U.S. Application Data

(60) Provisional application No. 62/407,798, filed on Oct. 13, 2016.

(51) Int. Cl.
*H04W 72/12* (2009.01)
*H04W 16/14* (2009.01)
(Continued)

(52) U.S. Cl.
CPC ....... *H04W 72/1263* (2013.01); *H04W 16/14* (2013.01); *H04W 72/0446* (2013.01);
(Continued)

(58) Field of Classification Search
CPC ............. H04W 72/1263; H04W 76/02; H04W 72/0446; H04W 16/14
See application file for complete search history.

(56) References Cited

U.S. PATENT DOCUMENTS

| 2015/0334685 A1 | 11/2015 | Ji et al. | |
| 2017/0347307 A1* | 11/2017 | Mehta | H04L 12/4633 |
| 2018/0109353 A1* | 4/2018 | Kwak | H04L 5/0044 |

OTHER PUBLICATIONS

Huawei et al: "Overview of URLLC Support in NR," 3GPP Draft; R1-1608843, 3RD Generation Partnership Project (3GPP), Mobile Competence Centre; 650 Route Des Lucioles; F-06921 Sophia-Antipolis Cedex; France, vol. RAN WG1, No. Lisbon, Portugal; 20161010-20161014, Oct. 1, 2016 (Oct. 1, 2016), XP051159170, Retrieved from the Internet: URL:http://www.3gpp.org/ftp/tsg_ran/WG1_RL1/TSGR1_86b/Docs/ [retrieved on Oct. 1, 2016].
(Continued)

*Primary Examiner* — Zhiren Qin
(74) *Attorney, Agent, or Firm* — Holland & Hart LLP

(57) ABSTRACT

A connection may be established between a base station and a user equipment (UE) using a radio frequency shared by multiple network operating entities. Resources (e.g., a frame) may be divided into exclusive, prioritized, and opportunistic sub-intervals for a given network operating entity coexisting within the shared radio frequency spectrum. Additionally, a set of low latency sub-intervals (e.g., reserved resources) may be designated for use by the network operating entity for mission critical (MiCr) and/or autonomous uplink transmissions. The network operating entity may indicate timing information for low latency sub-intervals during a sub-interval for exclusive use by the network operating entity. The UE may then transmit MiCr and/or autonomous uplink messages using the low latency intervals without performing a medium sensing procedure. In some cases, the sub-intervals for MiCr and autonomous uplink transmissions may be for exclusive use by the network operating entity.

32 Claims, 16 Drawing Sheets

(51) Int. Cl.
  *H04W 72/04* (2009.01)
  *H04W 74/00* (2009.01)
  *H04W 74/04* (2009.01)
  *H04W 76/10* (2018.01)

(52) U.S. Cl.
  CPC ......... *H04W 74/006* (2013.01); *H04W 74/04* (2013.01); *H04W 76/10* (2018.02)

(56) References Cited

OTHER PUBLICATIONS

International Search Report and Written Opinion—PCT/US2017/055255—ISA/EPO—dated Jan. 10, 2018 (165594WO).
Samdanis K., et al., "From Network Sharing to Multi-Tenancy: The 5G Network Slice Broker," IEEE Communications Magazine, IEEE Service Center Piscataway, US; vol. 54, No. 7, Jul. 1, 2016 (Jul. 1, 2016), pp. 32-39, XP011617038, ISSN: 0163-6804, DOI:10.1109/MCOM.2016.7514161 [retrieved on Jul. 14, 2016].

* cited by examiner

MISSION CRITICAL AND AUTONOMOUS UPLINK TRANSMISSION SUPPORT

CROSS REFERENCES

The present Application for Patent claims priority to U.S. Provisional Patent Application No. 62/407,798 by FAN, et al., entitled "MISSION CRITICAL AND AUTONOMOUS UPLINK TRANSMISSION SUPPORT," filed Oct. 13, 2016, assigned to the assignee hereof.

BACKGROUND

The following relates generally to wireless communication, and more specifically to mission critical (MiCr) and autonomous uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless communication system may operate over shared spectrum, meaning that the wireless communications system includes one or more frequency bands that may be shared by multiple network operating entities. In some instances, sharing of the frequency bands may include subdividing the frequency bands into ever-smaller bands dedicated for use by specific network operating entities. In other instances, at least portions of band spectrum may be available for use by more than one network operating entity.

Use of the available band spectrum may then be subject to a contention procedure that may involve the use of a medium-sensing procedure. For example, to avoid interference between different devices operated by the same network entity or between devices operated by different network operating entities, the wireless communication system may employ medium-sensing procedures, such as listen-before-talk (LBT), to ensure a particular channel is clear before transmitting a message. Such contention procedures may result in latency associated with accessing the communication medium, which may be especially detrimental for MiCr and autonomous uplink applications. Accordingly, improved procedures for allocating and using shared spectrum between network operating entities are desirable.

SUMMARY

The described techniques relate to improved methods, systems, devices, or apparatuses that support mission critical (MiCr) and autonomous uplink transmissions via low latency (e.g., reserved) resources within a system utilizing network operating entity-based resource partitioning. A connection may be established between a base station and a user equipment (UE) using a radio frequency (RF) spectrum shared by multiple network operating entities. Resources (e.g., a frame) may be divided into exclusive, prioritized, and opportunistic sub-intervals for a given network operating entity coexisting within the shared RF spectrum. Additionally, a set of low latency sub-intervals (e.g., reserved resources) may be designated for use by the network operating entity for MiCr and/or autonomous uplink transmissions. The network operating entity may indicate timing information for the set of low latency resources during a sub-interval for exclusive use by the network operating entity. A UE associated with the given network operating entity may then transmit MiCr and/or autonomous uplink messages using the low latency intervals without performing a medium sensing procedure. In some cases, the sub-intervals for MiCr and autonomous uplink may be non-overlapping and may be for exclusive use by the network operating entity.

A method of wireless communication is described. The method may include establishing a wireless connection with a base station for communication using a shared radio frequency spectrum band shared by a plurality of network operating entities, identifying a frame comprising a first plurality of sub-intervals for exclusive use by a network operating entity, prioritized use by the network operating entity, or opportunistic use by the network operating entity, identifying, within the frame, a second plurality of sub-intervals different from the first plurality, the second plurality comprising reduced latency communication sub-intervals designated for use by the network operating entity for autonomous uplink transmissions, mission critical uplink transmissions, or both, and transmitting an uplink message to the base station during the one or more sub-intervals of the second plurality, wherein the uplink message comprises an autonomous uplink transmission or a mission critical uplink transmission.

An apparatus for wireless communication is described. The apparatus may include means for establishing a wireless connection with a base station for communication using a shared radio frequency spectrum band shared by a plurality of network operating entities, means for identifying a frame comprising a first plurality of sub-intervals for exclusive use by a network operating entity, prioritized use by the network operating entity, or opportunistic use by the network operating entity, means for identifying, within the frame, a second plurality of sub-intervals different from the first plurality, the second plurality comprising reduced latency communication sub-intervals designated for use by the network operating entity for autonomous uplink transmissions, mission critical uplink transmissions, or both, and means for transmitting an uplink message to the base station during the one or more sub-intervals of the second plurality, wherein the uplink message comprises an autonomous uplink transmission or a mission critical uplink transmission.

Another apparatus for wireless communication is described. The apparatus may include a processor, memory in electronic communication with the processor, and instructions stored in the memory. The instructions may be operable to cause the processor to establish a wireless connection with a base station for communication using a shared radio frequency spectrum band shared by a plurality of network operating entities, identify a frame comprising a first plurality of sub-intervals for exclusive use by a network operating entity, prioritized use by the network operating entity, or opportunistic use by the network operating entity, identify, within the frame, a second plurality of sub-intervals different from the first plurality, the second plurality comprising reduced latency communication sub-intervals designated for use by the network operating entity for autonomous uplink transmissions, mission critical uplink transmissions, or both, and transmit an uplink message to the base station during the one or more sub-intervals of the second plurality, wherein the uplink message comprises an autonomous uplink transmission or a mission critical uplink transmission.

A non-transitory computer readable medium for wireless communication is described. The non-transitory computer-readable medium may include instructions operable to cause a processor to establish a wireless connection with a base station for communication using a shared radio frequency spectrum band shared by a plurality of network operating entities, identify a frame comprising a first plurality of sub-intervals for exclusive use by a network operating entity, prioritized use by the network operating entity, or opportunistic use by the network operating entity, identify, within the frame, a second plurality of sub-intervals different from the first plurality, the second plurality comprising reduced latency communication sub-intervals designated for use by the network operating entity for autonomous uplink transmissions, mission critical uplink transmissions, or both, and transmit an uplink message to the base station during the one or more sub-intervals of the second plurality, wherein the uplink message comprises an autonomous uplink transmission or a mission critical uplink transmission.

Some examples of the method, apparatus, and non-transitory computer-readable medium described above may further include processes, features, means, or instructions for receiving an indication of a timing of the second plurality of sub-intervals from the network operating entity.

In some examples of the method, apparatus, and non-transitory computer-readable medium described above, the indication may be received during a sub-interval for exclusive use by the network operating entity.

In some examples of the method, apparatus, and non-transitory computer-readable medium described above, a timing of the second plurality of sub-intervals may be preconfigured based at least in part on an identification (ID) of the network operating entity.

In some examples of the method, apparatus, and non-transitory computer-readable medium described above, transmitting the uplink message further comprises: transmitting the uplink message during a sub-interval of the second plurality that may be within an acquisition sub-interval of the frame, wherein the acquisition sub-interval also includes one or more sub-intervals for exclusive use by the network operating entity.

In some examples of the method, apparatus, and non-transitory computer-readable medium described above, transmitting the uplink message further comprises: transmitting the uplink message during a sub-interval of the second plurality that may be included between an end boundary of a sub-interval for prioritized use by the network operating entity and a start boundary of a sub-interval for opportunistic use by the network operating entity.

In some examples of the method, apparatus, and non-transitory computer-readable medium described above, the sub-intervals designated for autonomous uplink transmissions and the sub-intervals designated for mission critical uplink transmissions may be non-overlapping.

In some examples of the method, apparatus, and non-transitory computer-readable medium described above, the second plurality of sub-intervals may be for the exclusive use of the network operating entity.

Some examples of the method, apparatus, and non-transitory computer-readable medium described above may further include processes, features, means, or instructions for refraining from participating in a medium sensing procedure in relation to the second plurality of sub-intervals prior to transmission of the uplink message to the base station.

A method of wireless communication is described. The method may include establishing a wireless connection with a UE for communication using a shared radio frequency spectrum band shared by a plurality of network operating entities, identifying a frame comprising a first plurality of sub-intervals for exclusive use by a network operating entity, prioritized use by the network operating entity, or opportunistic use by the network operating entity, identifying, within the frame, a second plurality of sub-intervals different from the first plurality, the second plurality comprising reduced latency communication sub-intervals designated for use by the network operating entity for autonomous uplink transmissions, mission critical uplink transmissions, or both, and receiving an uplink message from the UE during the one or more sub-intervals of the second plurality, wherein the uplink message comprises an autonomous uplink transmission or a mission critical uplink transmission.

An apparatus for wireless communication is described. The apparatus may include means for establishing a wireless connection with a UE for communication using a shared radio frequency spectrum band shared by a plurality of network operating entities, means for identifying a frame comprising a first plurality of sub-intervals for exclusive use by a network operating entity, prioritized use by the network operating entity, or opportunistic use by the network operating entity, means for identifying, within the frame, a second plurality of sub-intervals different from the first plurality, the second plurality comprising reduced latency communication sub-intervals designated for use by the network operating entity for autonomous uplink transmissions, mission critical uplink transmissions, or both, and means for receiving an uplink message from the UE during the one or more sub-intervals of the second plurality, wherein the uplink message comprises an autonomous uplink transmission or a mission critical uplink transmission.

Another apparatus for wireless communication is described. The apparatus may include a processor, memory in electronic communication with the processor, and instructions stored in the memory. The instructions may be operable to cause the processor to establish a wireless connection with a UE for communication using a shared radio frequency spectrum band shared by a plurality of network operating entities, identify a frame comprising a first plurality of sub-intervals for exclusive use by a network operating entity, prioritized use by the network operating entity, or opportunistic use by the network operating entity, identify, within the frame, a second plurality of sub-intervals different from the first plurality, the second plurality comprising reduced latency communication sub-intervals designated for use by the network operating entity for autonomous uplink transmissions, mission critical uplink transmissions, or both, and receive an uplink message from the UE during the one or more sub-intervals of the second plurality, wherein the uplink message comprises an autonomous uplink transmission or a mission critical uplink transmission.

A non-transitory computer readable medium for wireless communication is described. The non-transitory computer-readable medium may include instructions operable to cause a processor to establish a wireless connection with a UE for communication using a shared radio frequency spectrum band shared by a plurality of network operating entities, identify a frame comprising a first plurality of sub-intervals for exclusive use by a network operating entity, prioritized use by the network operating entity, or opportunistic use by the network operating entity, identify, within the frame, a second plurality of sub-intervals different from the first plurality, the second plurality comprising reduced latency communication sub-intervals designated for use by the network operating entity for autonomous uplink transmissions, mission critical uplink transmissions, or both, and receive an uplink message from the UE during the one or more sub-intervals of the second plurality, wherein the uplink message comprises an autonomous uplink transmission or a mission critical uplink transmission.

Some examples of the method, apparatus, and non-transitory computer-readable medium described above may further include processes, features, means, or instructions for transmitting an indication of a timing of the second plurality of sub-intervals from the network operating entity.

In some examples of the method, apparatus, and non-transitory computer-readable medium described above, the indication may be transmitted during a sub-interval for exclusive use by the network operating entity.

In some examples of the method, apparatus, and non-transitory computer-readable medium described above, a timing of the second plurality of sub-intervals may be preconfigured based at least in part on an ID of the network operating entity.

In some examples of the method, apparatus, and non-transitory computer-readable medium described above, receiving the uplink message further comprises: receiving the uplink message during a sub-interval of the second plurality that may be within an acquisition sub-interval of the frame, wherein the acquisition sub-interval also includes one or more sub-intervals for exclusive use by the network operating entity.

In some examples of the method, apparatus, and non-transitory computer-readable medium described above, receiving the uplink message further comprises: receiving the uplink message during a sub-interval of the second plurality that may be included between an end boundary of a sub-interval for prioritized use by the network operating entity and a start boundary of a sub-interval for opportunistic use by the network operating entity.

In some examples of the method, apparatus, and non-transitory computer-readable medium described above, the sub-intervals designated for autonomous uplink transmissions and the sub-intervals designated for mission critical uplink transmissions may be non-overlapping.

In some examples of the method, apparatus, and non-transitory computer-readable medium described above, the second plurality of sub-intervals may be for the exclusive use of the network operating entity.

DETAILED DESCRIPTION

Wireless communications systems operated by different network operating entities (e.g., network operators) may share portions of a frequency spectrum. In some instances, a network operating entity may be configured to use some or all of a designated shared spectrum for at least a period of time before another network operating entity uses some or all of the designated shared spectrum for a different period of time. Thus, in order to allow network operating entities use of the full designated shared spectrum, and in order to mitigate interfering communications between the different network operating entities, certain resources (e.g., time and/or frequency resources) may be partitioned and allocated to the different network operating entities for certain types of communication.

For example, a network operating entity may be allocated certain time resources reserved for exclusive communication by the network operating entity using some or all of the shared spectrum. The network operating entity may also be allocated other time resources where the entity is given priority over other network operating entities to communicate. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Further, a wireless communication system may enable improved low latency transmissions (e.g., mission critical (MiCr) and autonomous uplink transmissions) by designating low latency sub-intervals (e.g., reserving resources) for such transmissions within the intervals defined for operator-based use. As such, MiCr and/or autonomous uplink transmissions may be associated with low latency and high reliability over a shared (e.g., multiple operator) spectrum. Access to the shared spectrum and the arbitration of time resources among different network operating entities may be centrally controlled by a separate entity, autonomously determined by a predefined arbitration scheme, or dynamically determined based on interactions between wireless nodes of the network operators.

Aspects of the disclosure are initially described in the context of a wireless communications system. Examples of wireless communication systems supporting improved MiCr and autonomous uplink transmission in shared spectrum, in addition to example timing diagrams are then described. Aspects of the disclosure are further illustrated by and described with reference to apparatus diagrams, system diagrams, and flowcharts that relate to MiCr and autonomous uplink transmission.

Figure 1:
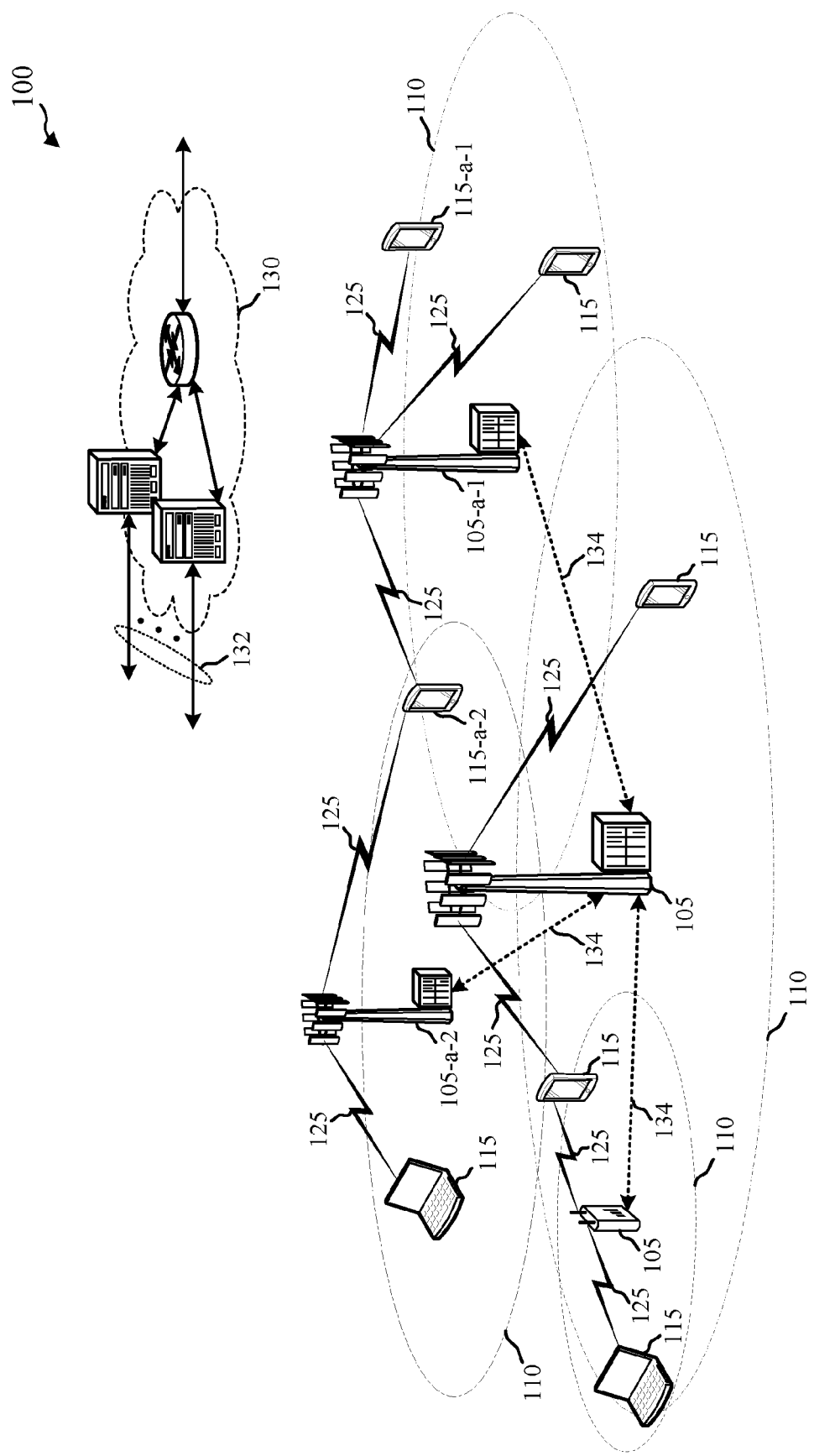
FIG. 1 illustrates an example of a system for wireless communication that supports mission critical (MiCr) and autonomous uplink transmission in accordance with aspects of the present disclosure.

FIG. 1 illustrates an example of a wireless communications system 100 in accordance with various aspects of the present disclosure. The wireless communications system 100 includes base stations 105, user equipments (UEs) 115, and a core network 130. In some examples, the wireless communications system 100 operates over a shared spectrum. The shared spectrum may be unlicensed or partially licensed to one or more network operating entities. Access to the spectrum may be limited and may be controlled by a separate coordination entity. In some examples, the wireless communications system 100 may be a Long Term Evolution (LTE) or LTE-Advanced (LTE-A) network. In yet other examples, the wireless communications system 100 may be a millimeter wave (mmW) system, a new radio (NR) system, a 5G system, or any other successor system to LTE. The wireless communications system 100 may be operated by more than one network operating entity. Wireless resources may be partitioned and arbitrated among the different network operators for coordinated communication between the network operators over the wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. The core network 130 may provide user authentication, access authorization, tracking, Internet Protocol (IP) connectivity, and other access, routing, or mobility functions. At least some of the base stations 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105.

In some cases, UE 115 and base station 105 may operate in a shared radio frequency spectrum band, which may include licensed or unlicensed frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. These inefficiencies may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Accordingly, in some examples, wireless communications system 100 is operated by multiple network operating entities, and the different network operating entities may share wireless spectrum (e.g., unlicensed spectrum). In accordance with aspects of the present disclosure, the resources shared between the network operating entities may be partitioned (e.g., in time) and allocated among the network operating entities to facilitate coordinated communications. For example, in wireless communications system 100, base station 105-a-1 may communicate with UE 115-a-1, and both may be associated with a same network operating entity. Base station 105-a-2 may communicate with UE 115-a-2, each of which may similarly be associated with a different network operating entity. By time-partitioning the shared spectrum according to network operating entities, the communications between base station 105-a-1 and UE 115-a-1 and the communications between base station 105-a-2 and UE 115-a-2 may each occur during respective time intervals and may avail themselves of an entirety of a designated shared spectrum. To do so, and as more fully explained below, certain resources may be partitioned (e.g., in time) and allocated to the different network operating entities for certain types of communication.

In some examples, a base station 105 or an entity of the core network 130 may act as a central arbitrator to manage access and coordinate the partitioning of resources among different network operating entities operating within the wireless communications system 100. The central arbitrator may include a spectrum access system (SAS), in some examples.

In some examples, the wireless communications system 100 may be time-synchronized. In this way, different network operating entities may each operate at different time intervals within a frame of time, with each network operating entity being time-synchronized with other network operating entities. Traditionally, a UE 115 attempting to access wireless communications system 100 may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-Automatic Repeat Request (HARD) Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

Figure 2:
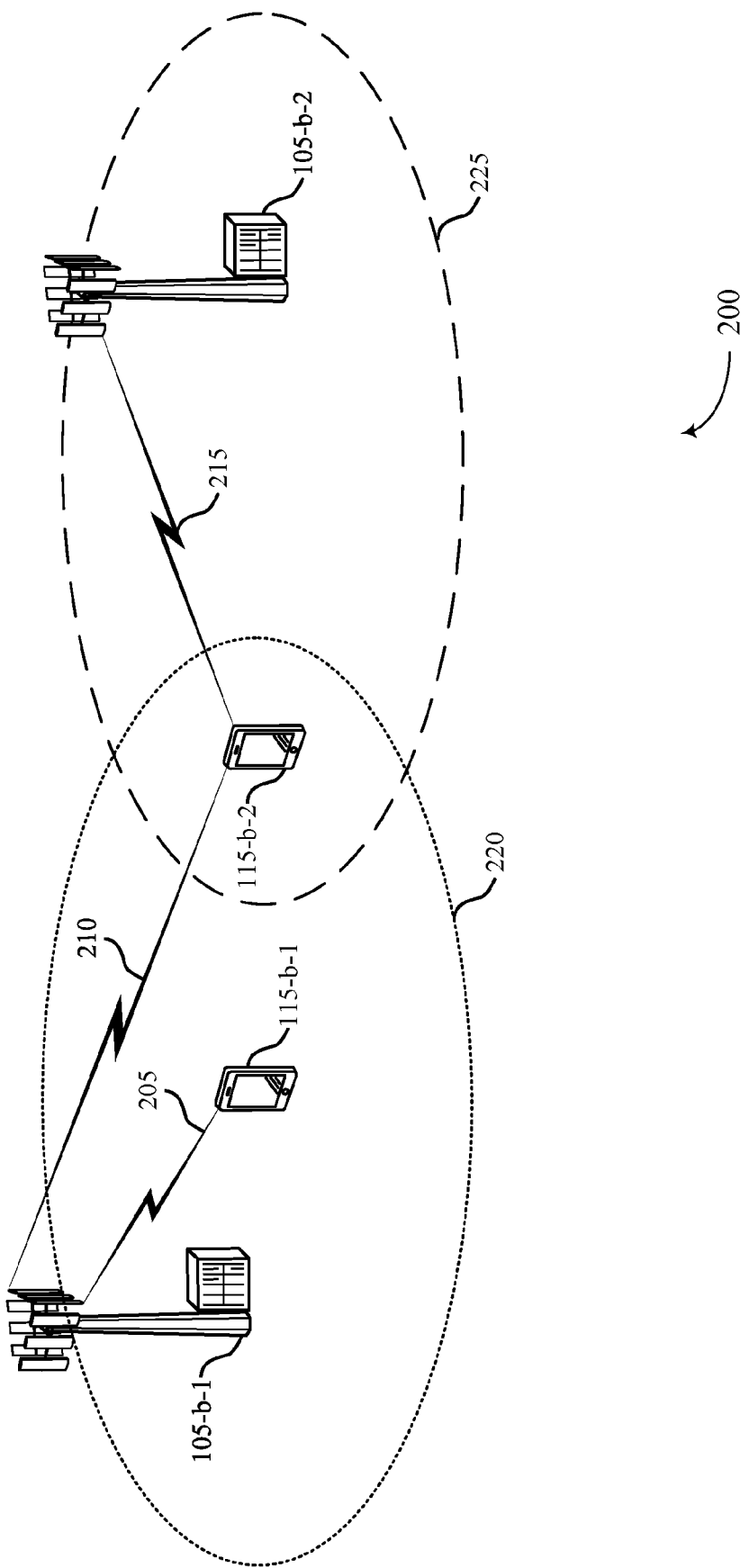
FIG. 2 illustrates an example of a wireless communication system that supports MiCr and autonomous uplink transmission in accordance with aspects of the present disclosure.

FIG. 2 illustrates an example of a wireless communications system 200 that supports coordinated resource partitioning. Wireless communications system 200 may include a base station 105-b-1, a base station 105-b-2, a UE 115-b-1, and a UE 115-b-2, which may be examples of the corresponding devices described with reference to FIG. 1. Base station 105-b-1 and base station 105-b-2 may communicate with UEs 115 or other wireless devices within their respective coverage areas 220 and 225. In some examples, wireless communications system 200 is operated by multiple network operating entities (e.g., network operators), and the different network operating entities may share wireless spectrum (e.g., shared or unlicensed spectrum). In accordance with aspects of the present disclosure, the resources shared between the network operating entities may be partitioned and allocated among the network operating entities to facilitate coordinated communications.

Base station 105-b-1 may be operated by one or more network operating entities. For example, base station 105-b-1 may be operated by a first network operating entity to communicate with UE 115-b-1 via communication link 205, and base station 105-b-1 may be operated by a second network operating entity to communicate with UE 115-b-2 via communication link 210. As described in more detail below, the coordination at base station 105-b-1 of communications between UE 115-b-1 and UE 115-b-2 may be based on a partitioned and allocated time scale between the first and second network operators.

Base station 105-b-2 may also be operated by one or more network operating entities. In some examples, base station 105-b-2 is operated by a third network operating entity to communicate with UE 115-b-2 via communication link 215. In this example, UE 115-b-2 may be configured to operate with both the second and third network operating entities. The coordination at UE 115-b-2 of communications between base station 105-b-1 and base station 105-b-2 may be based on a partitioned and allocated time scale between the network operators.

The shared spectrum used by wireless communications system 200 may be efficiently used by employing a coordinated resource partitioning scheme between the multiple network operating entities. For example, the shared spectrum may be partitioned by classifying time resources into intervals and assigning the intervals to different network operating entities. In some examples, certain time intervals may be allocated for exclusive use by a particular network operating entity. Other time intervals may be allocated for prioritized use by a particular network operating entity, but may also be opportunistically accessed by the other network operating entities. In yet other examples, certain time intervals may be designated for opportunistic use by all network operating entities.

Access to the wireless communications system 200, the portioning and allocation of the resources, and/or the synchronization of the network operating entities may be controlled by a central coordinator (e.g., SAS). In some examples, the partition and classification of resources may be autonomously determined based on the number of network operating entities. Synchronization between the network operating entities may occur explicitly through centralized signaling. Additionally or alternatively, the entities may employ a self-synchronization scheme based on "network-listening" where the wireless nodes (e.g., base stations 105) from different network operating entities listen to each other and determine a timing synchronization accordingly.

In some cases, the shared spectrum used by wireless communication system 200 may be used more efficiently by use of a sharing mechanism between multiple operators. As an example, wireless communication system 200 may support operator based resource partitioning (e.g., coordinated mode operation) to increase system throughput and performance (e.g., to reduce potential packet collisions resulting from concurrent overlapping transmissions). Such resources may be classified in terms of priority (e.g., among network operating entities) or access requirements (e.g., medium sensing requirements). Further, wireless communication system 200 may enable improved low latency transmissions (e.g., for MiCr and autonomous uplink transmissions) by designating a set of sub-intervals (e.g., reserving resources) for such transmissions within the intervals defined for operator based resource partitioning. As such, wireless communication system 200 may exemplify techniques for transmission associated with low latency and high reliability over a shared (e.g., multiple operator) spectrum.

In some examples, resources of wireless communication system 200 may be partitioned into time intervals, which may be referred to as frames (e.g., or superframes). In some cases, wireless communications system 200 and the associated time partitions may be referred to as a coordinated regime. In some embodiments, frames in a coordinated regime may themselves contain specific partitions. These partitions may include intervals for acquisition signals as well as arbitration intervals (e.g., for unscheduled uplink communications). In some embodiments, resources within the acquisition and arbitration intervals may be further divided (e.g., depending on the number of network operating entities). In some embodiments, these further resource divisions may be associated with a specific network operating entity.

As an example, an acquisition interval (A-INT) may be a dedicated interval every frame, e.g., for synchronization (SYNC), paging, SIBs, physical broadcast channel (PBCH), etc. Each network operating entity may be assigned an allocation of resources within an A-INT to send, e.g., PSSs, SSSs, PBCH, SIB, or any combination thereof. In some embodiments, all nodes (e.g., base stations 105) of a given network operating entity may transmit at the same time (e.g., using an appropriate multiple access technique). In some embodiments, different network operating entities may employ time division multiplexing (TDM) within an A-INT, as discussed below with respect to FIG. 3.

In some embodiments, an arbitration interval within a frame or superframe may include one or more guaranteed intervals (G-INTs), one or more opportunistic intervals (O-INTs), or some combination thereof. A G-INT may be a subinterval during which the assigned network operating entity may access resources without LBT. The interval of resources used by the network operating entity during the G-INT may be referred to as a prioritized sub-interval. An O-INT may be a subinterval during which unassigned network operating entities may opportunistically access resources using medium sensing (e.g., LBT). Accordingly, an O-INT for one network operating entity may overlap at least partially in time with a G-INT for another network operating entity. In some examples, access to a G-INT or O-INT may be preceded by a reservation signal (e.g., request-to-send (RTS)/clear-to-send (CTS)), and the contention window (CW) may be randomly chosen between one and the total number of network operating entities.

In some examples, a network operating entity may employ or be compatible with coordinated multipoint (CoMP) communications. For example a network operating entity may employ CoMP and dynamic TDD in a G-INT and opportunistic CoMP in an O-INT as needed.

In some embodiments, these further subdivisions of the arbitration and acquisition intervals may be associated with specific resource classifications. As an example, some resources may be classified as exclusive resources. These resources may be reserved for CCA exempt transmissions (CET) of overhead channels for the corresponding network operating entity (e.g., SYNC signals, SIB, paging, random access resources, etc.). Additionally or alternatively, these resources may be reserved for protected data transmissions for a given network operating entity (e.g., to address the hidden node issue). Exclusive resources may be intended for direct operator access (e.g., no LBT or medium sensing needed) and other network operating entities may be disallowed from accessing these resources. Exclusive resources may be associated with acquisition intervals.

In some examples, resources may be classified as Assigned with Priority resources. An intended network operating entity may access these resources (e.g., prioritized resources) directly and without medium sensing (e.g., LBT). Additionally, non-intended operators may opportunistically access these resources (e.g., opportunistic resources) based on medium sensing or activity indication from higher priority nodes. In some embodiments, this activity indication may be explicit or implicit. In some examples, Assigned with Priority resources may be associated with arbitration intervals (e.g., which may include G-INTs and/or O-INTs). In some embodiments, Assigned with Priority resources may be associated with G-INTs for an intended network operating entity and with O-INTs for non-intended network operating entities.

In some cases, if there are no underlying priorities amongst network operating entities (e.g., there may be no intended operator access), network operating entities may opportunistically access resources (e.g., using medium sensing, CW adaptation, etc.). If the arbitration interval cannot be evenly divided amongst the network operating entities, resources may be associated with O-INTs for all network operating entities.

In some cases, resources may be reserved in an acquisition or arbitration interval, e.g., for MiCr or autonomous uplink transmissions. As an example, resources may be allocated to a single network operating entity for a subinterval (e.g., a G-INT as discussed above). In aspects, this resource allocation may not last for the entire subinterval. The resource allocation may be shortened (e.g., by one or more symbols) in order to create space for transmissions that may require low latency and high reliability. In some cases, the resources made available by shortening the resource allocation may be referred to as reserved resources. Reserved resources may be assigned to one or more network operating entities (e.g., each assigned network operating entity may access its assigned reserved resources without medium sensing). In some embodiments, reserved resources may be accessed opportunistically (e.g., with LBT).

More specifically, and referring again to FIG. 2, MiCr transmissions from any of UE 115-$b$-1, UE 115-$b$-2, base station 105-$b$-1, or base station 105-$b$-2 may be transmitted using reserved resources in an acquisition or arbitration interval. MiCr transmissions from a UE 115 to a base station 105 are MiCr uplink transmissions, while MiCr transmissions from a base station 105 to a UE 115 are MiCr downlink transmissions. Resources reserved for MiCr transmissions do not require contention across network operating entities—the reserved resources are reserved for the exclusive use of a given network operating entity. The reserved resources may also be reserved for autonomous uplink transmissions from a UE 115 to a base station 105. Resources reserved for autonomous uplink transmissions may be shared across multiple network operating entities, and thus may require a contention or other procedure for access.

Figure 3:
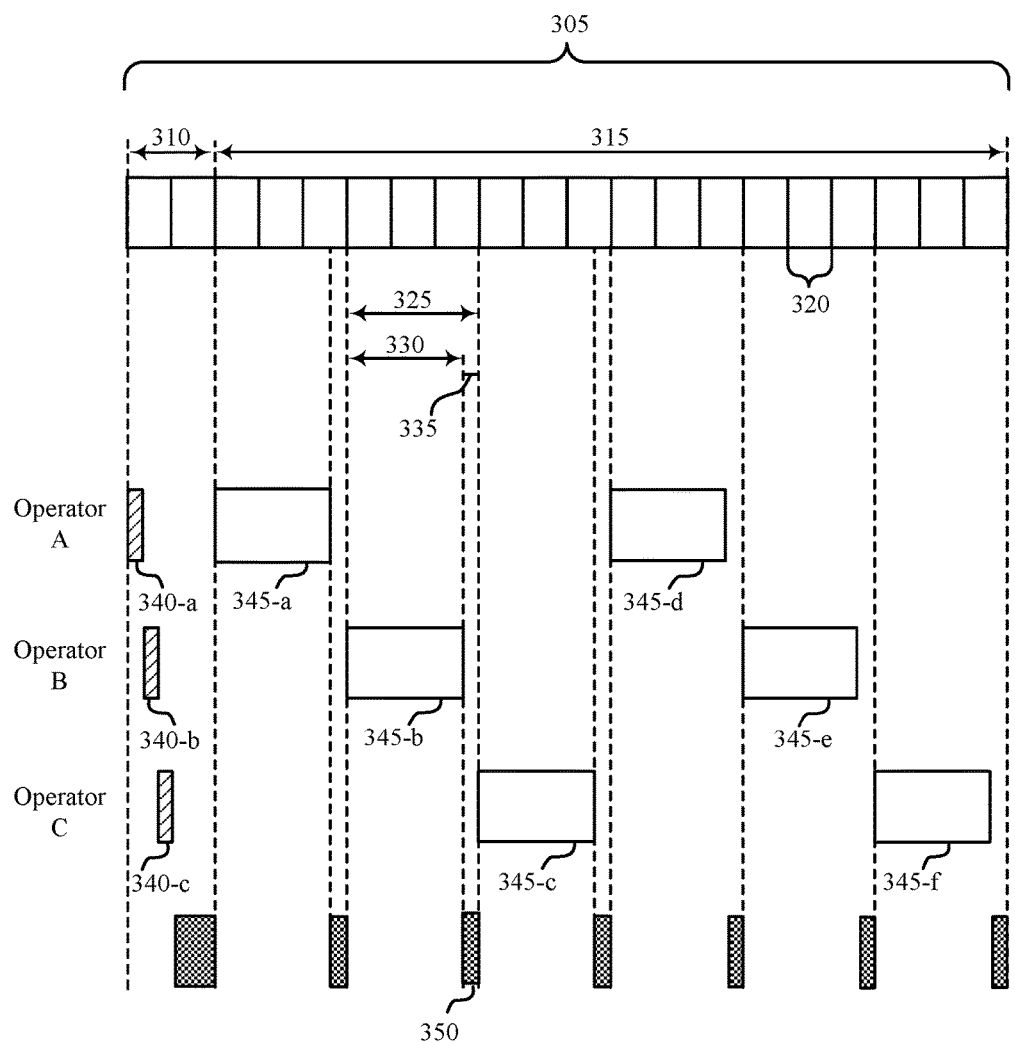
FIG. 3 illustrates an example of a timing diagram that supports MiCr and autonomous uplink transmission in accordance with aspects of the present disclosure.

FIG. 3 illustrates an example of a timing diagram 300 for coordinated resource partitioning (e.g., operator based resource partitioning) that supports MiCr and autonomous uplink transmission. The timing diagram 300 includes a frame 305 (e.g., which may alternatively be referred to as a superframe), which may represent a fixed duration of time (e.g., 20 ms). Frame 305 may be repeated for a given communication session and may be used by a wireless system such as wireless communications systems 100 and 200 described with reference to FIGS. 1 and 2. The frame 305 may be divided into intervals such as an A-INT 310 and an arbitration interval 315. As described in more detail below, the A-INT 310 and arbitration interval 315 may be further divided into subintervals, designated for certain resource types, and allocated to different network operating entities (e.g., operator A, operator B, and operator C in the present example) to facilitate coordinated communications between the different network operating entities. For example, the arbitration interval 315 may be divided into multiple segments 325 (e.g., based on operator identity (ID)). Segments 325 may be further divided into subintervals 330 and 335 (e.g., based on resource type) as described below. Also, the frame 305 may be further divided into a plurality of subframes 320 with a fixed duration (e.g., 1 ms). While timing diagram 300 illustrates three different network operating entities (e.g., Operator A, Operator B, Operator C), the number of network operating entities using the frame 305 for coordinated communications may be greater than or fewer than the number illustrated in timing diagram 300.

The A-INT 310 may be a dedicated interval of the frame 305 that is reserved for exclusive communications by network operating entities (e.g., for SYNC, paging, SIBs, PBCH, etc.). In some embodiments, an A-INT 310 may be associated with a granularity of 2-ms (e.g., two subframes 320). Each network operating entity may be assigned a resource allocation 340 to send, e.g., PSS, SSS, PBCH, SIB, or any combination thereof within an A-INT 310. The position of the resources for a given network operating entity may be known (e.g., they may be sequentially allocated in time according to the operator ID within A-INT 310). As an example, during A-INT 310, Operators A, B, and C may be assigned resource allocations 340-a, 340-b, and 340-c, respectively. In some cases, resource allocations 340 may be referred to as exclusive resources. According to aspects of the present disclosure, other network operating entities may be disallowed from accessing resources allocated to the given network operating entity (e.g., Operators B and C may be disallowed from accessing resource allocation 340-a even if Operator A chooses not to communicate using these resources). In aspects, a given operator (e.g., Operator A) communicating may refer to a UE 115 or base station 105 associated with the given operator transmitting over the resources.

In some embodiments, arbitration intervals 315 may contain one or more G-INTs, which may be a time period during which the assigned network operating entity may access resource allocations 345 directly and transmit without LBT. Resource allocations 345 may be referred to as Assigned with Priority resources, as described above with reference to FIG. 2. In some embodiments, arbitration intervals 315 may additionally or alternatively contain O-INTs, which may be subintervals during which unassigned network operating entities may access resource allocations 345 using medium sensing (e.g., LBT). In some embodiments, these subintervals may be associated with a granularity. As an example, the granularity of G-INT and O-INT subintervals may be 3-ms (e.g., three subframes 320). During arbitration interval 315, Operator A may be assigned resource allocations 345-a and 345-d, Operator B may be assigned resource allocations 345-b and 345-e, and Operator C may be assigned resource allocations 345-c and 345-f.

As an example, during the indicated segment 325, Operator B may be referred to as an intended operator. Operator B may access resource allocation 345-b directly and transmit without LBT. This segment 325 may be referred to as a G-INT for Operator B. During this segment 325, Operators A and C may be referred to as non-intended network operating entities. Operators A and C may access resource allocation 345-b using medium sensing (e.g., LBT). Accordingly, this segment 325 may be referred to as an O-INT for Operators A and C.

The various resource allocations 340 and 345 illustrated in FIG. 3 appear to be staggered to illustrate their association with their respective operators, but these resources may all be on the same frequency bandwidth. Thus, if viewed along a time-frequency grid, the resource allocations 340 and 345 may appear as a contiguous line within the frame 305. This partitioning of data may be an example of time division multiplexing (TDM). Alternatively, the resource allocations 340 and 345 may overlap partially in frequency.

In some examples, each subframe 320 may contain 14 symbols (e.g., 250-μs for 60 kHz tone spacing). These subframes 320 may be standalone, self-contained Interval-Cs (ITCs) or the subframes 320 may be a part of a long ITC. An ITC may be a self-contained transmission starting with a downlink transmission and ending with a uplink transmission. In some embodiments, an ITC may contain one or more subframes 320 operating contiguously upon medium occupation. In some cases, there may be a maximum of eight operating entities in a 2-ms A-INT 310 assuming a 250-μs transmission opportunity.

In some embodiments, transmissions during A-INT 310 or arbitration interval 315 may be shortened in order to reserve a set of resources 350 for transmissions that require high reliability and low latency (e.g., for MiCr and/or autonomous uplink transmissions). As an example, segments 325 may be further subdivided into subintervals 330 and subintervals 335. Resource allocations 345 within subintervals 330 may be assigned with priority to a given network operating entity and opportunistically accessed by a non-intended network operating entity, as described above. Resources 350 within subintervals 335 may be referred to as reserved resources (e.g., low latency resources), as described with reference to FIG. 2. In some embodiments, autonomous uplink and MiCr resources 350 may be disjoint (e.g., there may be no contention between MiCr and autonomous uplink traffic). Additionally, in some embodiments, resources 350 reserved for MiCr transmissions may also be exclusive to given network operating entities, meaning that there may be no contention for MiCr transmissions. Resources 350 reserved for autonomous uplink traffic may be shared between multiple network operating entities, meaning that there may be contention for autonomous uplink transmissions.

As an example, the subintervals 335 (e.g., last 4 symbols of segments 325) may correspond to resources 350 that are reserved for MiCr and/or autonomous uplink transmissions. In some embodiments (e.g., for MiCr transmissions), resources 350 may be allocated to a single network operating entity. The intended network operating entity may access resources 350 without a need for medium sensing (e.g., LBT). In other embodiments, resources 350 may be further partitioned (e.g., on a symbol basis), and each partition may be allocated to a single network operating entity, which may then access a portion of resources 350 without medium sensing. In yet other embodiments (e.g., for autonomous uplink transmissions), operating entities may opportunistically access these resources 350 (e.g., using medium sensing, CW adaptation, etc.) to transmit, for example, autonomous uplink messages.

In general, the number of opportunities for a given network operating entity to access reserved resources 350 may be greater (and sometimes much greater) than the number of opportunities the given network operating entity may have to access resource allocation 340 (exclusive resources) or resource allocations 345 (Assigned with Priority resources) within frame 305. This increased frequency of reserved resources 350 thus accommodates the high priority and low latency requirements of MiCr and autonomous uplink transmissions.

Figure 4:
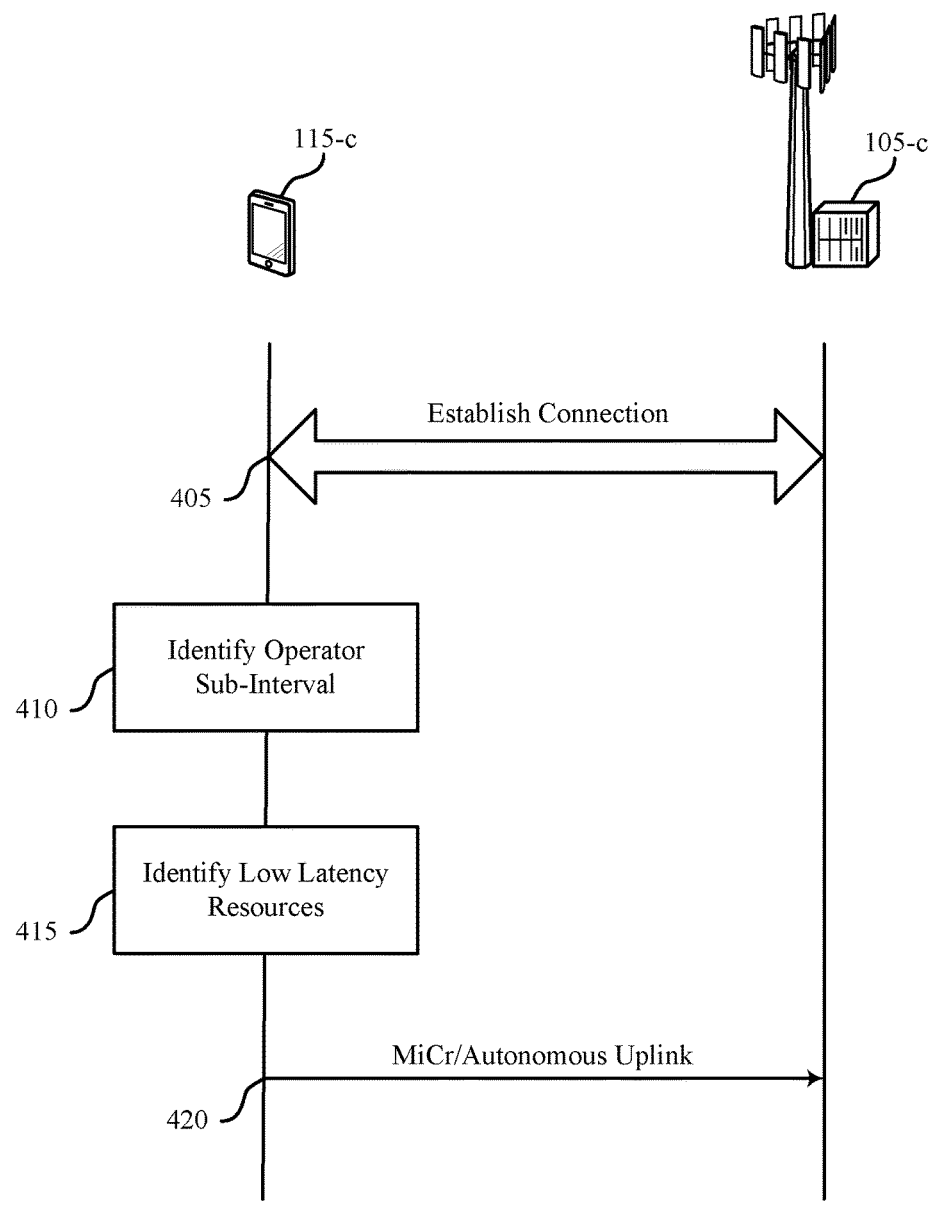
FIG. 4 illustrates an example of a process flow that supports MiCr and autonomous uplink transmission in accordance with aspects of the present disclosure.

FIG. 4 illustrates an example of a flow diagram 400 between a UE 115-c and a base station 105-c supporting MiCr and autonomous uplink transmissions in a shared spectrum in accordance with aspects of the present disclosure. UE 115-*c* and base station 105-*c* may be examples of the corresponding devices described with reference to FIGS. 1 and 2.

At step 405, a wireless connection may be established between UE 115-*c* and base station 105-*c* using a radio frequency spectrum shared by multiple network operating entities. In the present example, the connection may be associated with a single network operating entity. Resources (e.g., a superframe) may be divided into sub-intervals, and these resources may be further classified as exclusive, prioritized, or opportunistic. Additionally, a set of low latency sub-intervals (e.g., reserved resources) may be designated for use by the network operating entity for MiCr or autonomous uplink transmissions. These reserved resources may be distinct from the resources classified as exclusive, prioritized, or opportunistic.

At step 410, the UE 115-*c* may identify one or more sub-intervals associated with a single network operating entity. In some cases these sub-intervals may contain exclusive, prioritized, or opportunistic resources for the given network operating entity.

At step 415, the UE 115-*c* may identify a set of low latency resources (e.g., reserved resources) for transmission of MiCr or autonomous uplink data. In some cases, the network operating entity may indicate timing information for the set of low latency resources. In some cases, the timing information may be received by UE 115-*c* during a sub-interval for exclusive use by the network operating entity (e.g., an acquisition interval). The timing information may be preconfigured based at least in part on an identification of the given network operating entity. In some cases, the low latency resources designated for autonomous uplink or MiCr communications may be disjoint (e.g., they may not overlap). The low latency resources may be designated as exclusive for a given network operating entity.

At step 420, the UE 115-*c* may transmit an uplink message to base station 105-*c* during one of the sub-intervals containing low latency resources. In some cases the uplink message may comprise an autonomous uplink or MiCr transmission. In some cases, the uplink message may be transmitted during a sub-interval of an A-INT containing one or more sub-intervals for exclusive use by the network operating entity. In some cases, the uplink message may be transmitted during a sub-interval containing prioritized resources for the given network operating entity (e.g., a G-INT). In some cases, the uplink message may be transmitted at the end of a sub-interval containing prioritized resources for the given network operating entity and before the start of a sub-interval designated for opportunistic use by the network operating entity (e.g., an O-INT). In some cases, UE 115-*c* may transmit the uplink message without performing medium sensing (e.g., LBT).

Although identification steps (e.g., of the operator-specific sub-intervals and the low latency resources) are illustrated as occurring at UE 115-*c*, these identification steps may additionally or alternatively be performed at base station 105-*c*. Additionally, MiCr transmissions may be either uplink transmissions or downlink transmissions. Therefore, while step 420 illustrates a MiCr uplink transmission or an autonomous uplink transmission, MiCr downlink transmissions from the base station 105-*c* to the UE 115-*c* may also occur during the identified low latency resources.

Figure 5:
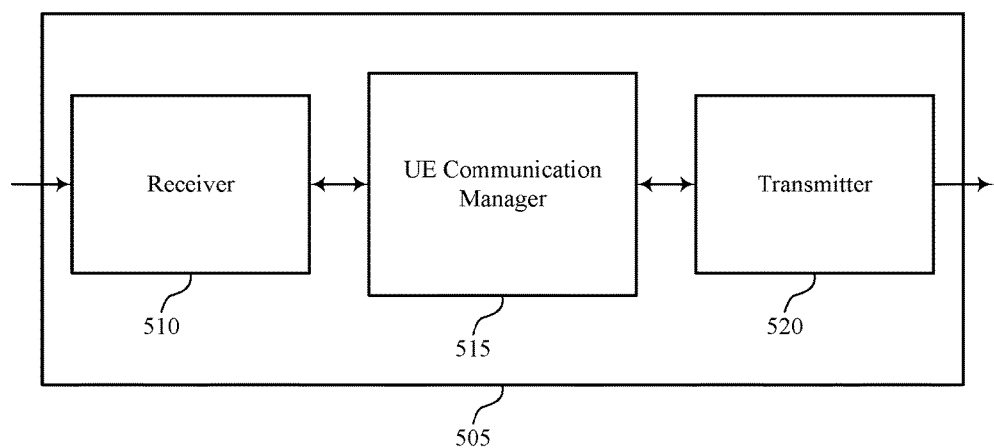
FIGS. 5 through 7 show block diagrams of a device that supports MiCr and autonomous uplink transmission in accordance with aspects of the present disclosure.

FIG. 5 shows a block diagram 500 of a wireless device 505 that supports MiCr and autonomous uplink transmission in accordance with various aspects of the present disclosure. Wireless device 505 may be an example of aspects of a UE 115 as described with reference to FIG. 1. Wireless device 505 may include receiver 510, UE communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to MiCr and autonomous uplink transmissions, etc.). Information may be passed on to other components of the device. The receiver 510 may be an example of aspects of the transceiver 835 described with reference to FIG. 8.

UE communication manager 515 may be an example of aspects of the UE communication manager 815 described with reference to FIG. 8. UE communication manager 515 may establish a wireless connection with a base station for communication using a shared RF spectrum band. In some cases, the RF band may be shared by a set of network operating entities. UE communication manager 515 may identify a frame including a first set of sub-intervals for exclusive use by a network operating entity, prioritized use by the network operating entity, or opportunistic use by the network operating entity. Further UE communication manager 515 may identify, within the frame, a second set of sub-intervals different from the first set, the second set including reduced latency communication sub-intervals designated for use by the network operating entity for autonomous uplink transmissions, MiCr transmissions, or both. Finally, UE communication manager 515 may transmit an uplink message to the base station during the one or more sub-intervals of the second set, where the uplink message includes an autonomous uplink transmission or a MiCr uplink transmission. Alternatively, UE communication manager 515 may receive a downlink message from the base station during the one or more sub-intervals of the second set, where the downlink message includes a MiCr downlink transmission.

Transmitter 520 may transmit signals generated by other components of the device, including MiCr or autonomous uplink transmissions. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
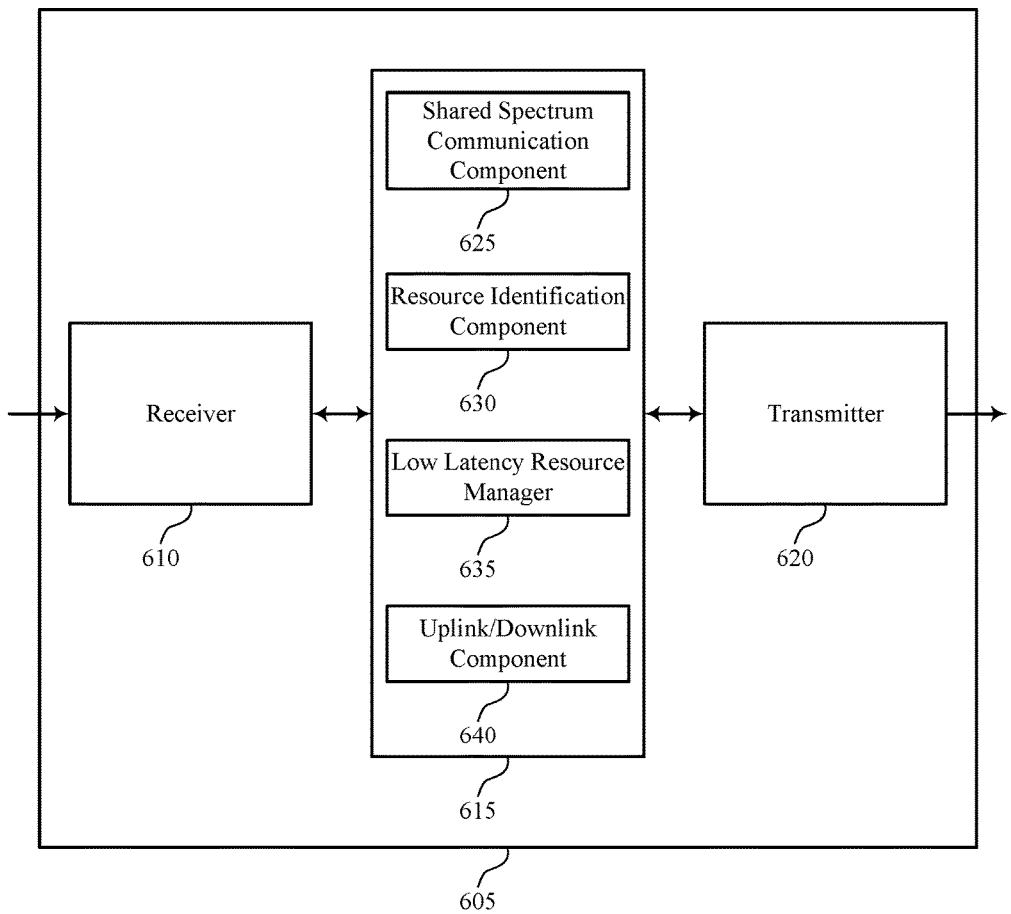

FIG. 6 shows a block diagram 600 of a wireless device 605 that supports MiCr and autonomous uplink transmission in accordance with various aspects of the present disclosure. Wireless device 605 may be an example of aspects of a wireless device 505 or a UE 115 as described with reference to FIGS. 1, 2, and 5. Wireless device 605 may include receiver 610, UE communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to MiCr and autonomous uplink transmissions, etc.). Information may be passed on to other components of the device. The receiver 610 may be an example of aspects of the transceiver 835 described with reference to FIG. 8.

UE communication manager 615 may be an example of aspects of the UE communication manager 815 described with reference to FIG. 8. UE communication manager 615 may also include shared spectrum communication component 625, resource identification component 630, low latency resource manager 635, and uplink/downlink component 640.

Shared spectrum communication component 625 may establish a wireless connection with a base station for communication using a shared RF spectrum band shared by a set of network operating entities and refrain from participating in a medium sensing procedure in relation to the second set of sub-intervals prior to transmission of an uplink message to the base station or receipt of a downlink message from the base station.

Resource identification component 630 may identify a frame including a first set of sub-intervals for exclusive use by a network operating entity, prioritized use by the network operating entity, or opportunistic use by the network operating entity.

Low latency resource manager 635 may identify, within the frame, a second set of sub-intervals different from the first set, the second set including reduced latency communication sub-intervals designated for use by the network operating entity for autonomous uplink transmissions, MiCr uplink or downlink transmissions, or both. In some cases, the sub-intervals designated for autonomous uplink transmissions and the sub-intervals designated for MiCr transmissions are non-overlapping. In some cases, the second set of sub-intervals are for the exclusive use of the network operating entity. In some cases, the second set of sub-intervals are designated for use by the network operating entity for MiCr transmissions and are contention-free. In other cases, the second set of sub-intervals are designated for use by the network operating entity for autonomous uplink transmissions and may be used with a contention procedure (e.g., LBT, CCA, etc.).

Uplink/downlink component 640 may transmit an uplink message to the base station during the one or more sub-intervals of the second set, where the uplink message includes an autonomous uplink transmission or a MiCr uplink transmission. Alternatively, uplink/downlink component 640 may receive a downlink message from the base station during the one or more sub-intervals of the second set, where the downlink message includes a MiCr downlink transmission. In some cases, transmitting or receiving the message further includes transmitting the message during a sub-interval of the second set that is within an acquisition sub-interval of the frame, where the acquisition sub-interval also includes one or more sub-intervals for exclusive use by the network operating entity. In some cases, transmitting or receiving the message further includes transmitting the message during a sub-interval of the second set that is included between an end boundary of a sub-interval for prioritized use by the network operating entity and a start boundary of a sub-interval for opportunistic use by the network operating entity.

Transmitter 620 may transmit signals generated by other components of the device, including MiCr and autonomous uplink transmissions. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
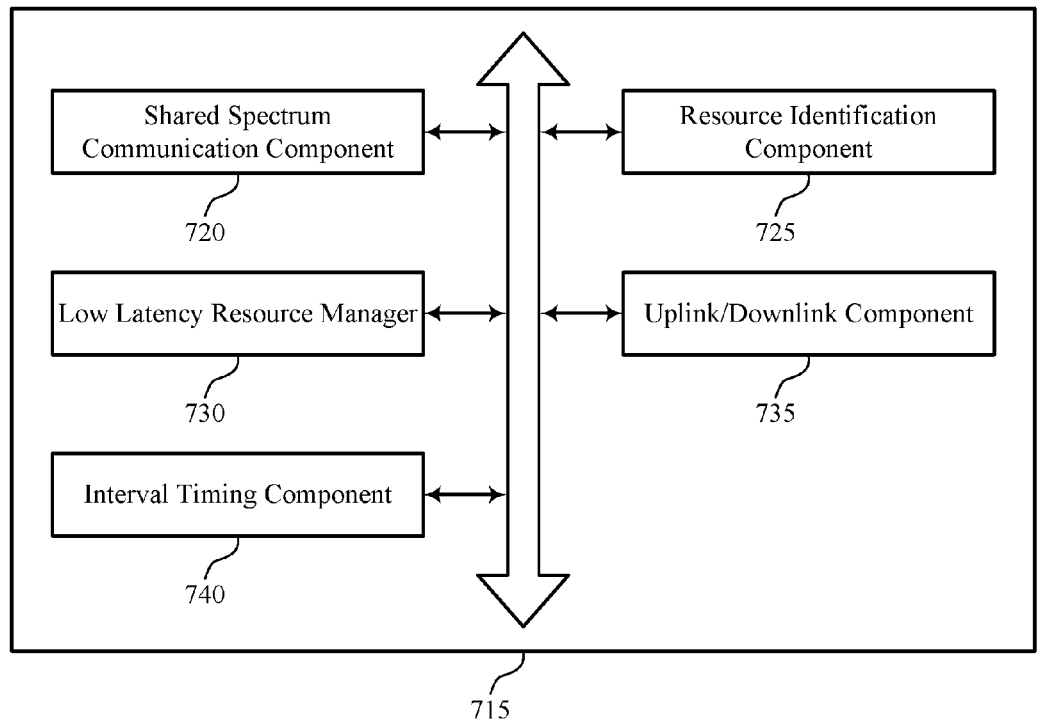

FIG. 7 shows a block diagram 700 of a UE communication manager 715 that supports MiCr and autonomous uplink transmission in accordance with various aspects of the present disclosure. The UE communication manager 715 may be an example of aspects of a UE communication manager 515, a UE communication manager 615, or a UE communication manager 815 described with reference to FIGS. 5, 6, and 8. The UE communication manager 715 may include shared spectrum communication component 720, resource identification component 725, low latency resource manager 730, uplink/downlink component 735, and interval timing component 740. Each of these modules may communicate, directly or indirectly, with one another (e.g., via one or more buses).

Shared spectrum communication component 720 may establish a wireless connection with a base station for communication using a shared RF spectrum band shared by a set of network operating entities and refrain from participating in a medium sensing procedure in relation to the second set of sub-intervals prior to transmission of an uplink message to the base station or receipt of a downlink message from the base station.

Resource identification component 725 may identify a frame including a first set of sub-intervals for exclusive use by a network operating entity, prioritized use by the network operating entity, or opportunistic use by the network operating entity.

Low latency resource manager 730 may identify, within the frame, a second set of sub-intervals different from the first set, the second set including reduced latency communication sub-intervals designated for use by the network operating entity for autonomous uplink transmissions, MiCr transmissions, or both. In some cases, the sub-intervals designated for autonomous uplink transmissions and the sub-intervals designated for MiCr transmissions are non-overlapping. In some cases, the second set of sub-intervals are for the exclusive use of the network operating entity.

Uplink/downlink component 735 may transmit an uplink message to the base station during the one or more sub-intervals of the second set, where the uplink message includes an autonomous uplink transmission or a MiCr uplink transmission. Alternatively, uplink/downlink component 735 may receive a downlink message from the base station during the one or more sub-intervals of the second set, where the downlink message includes a MiCr downlink transmission. In some cases, transmitting or receiving the message further includes transmitting the message during a sub-interval of the second set that is within an acquisition sub-interval of the frame, where the acquisition sub-interval also includes one or more sub-intervals for exclusive use by the network operating entity. In some cases, transmitting or receiving the message further includes transmitting the message during a sub-interval of the second set that is included between an end boundary of a sub-interval for prioritized use by the network operating entity and a start boundary of a sub-interval for opportunistic use by the network operating entity.

Interval timing component 740 may receive an indication of a timing of the second set of sub-intervals from the network operating entity. In some cases, the indication is received during a sub-interval for exclusive use by the network operating entity. In some cases, a timing of the second set of sub-intervals is preconfigured based on an identification (ID) of the network operating entity.

Figure 8:
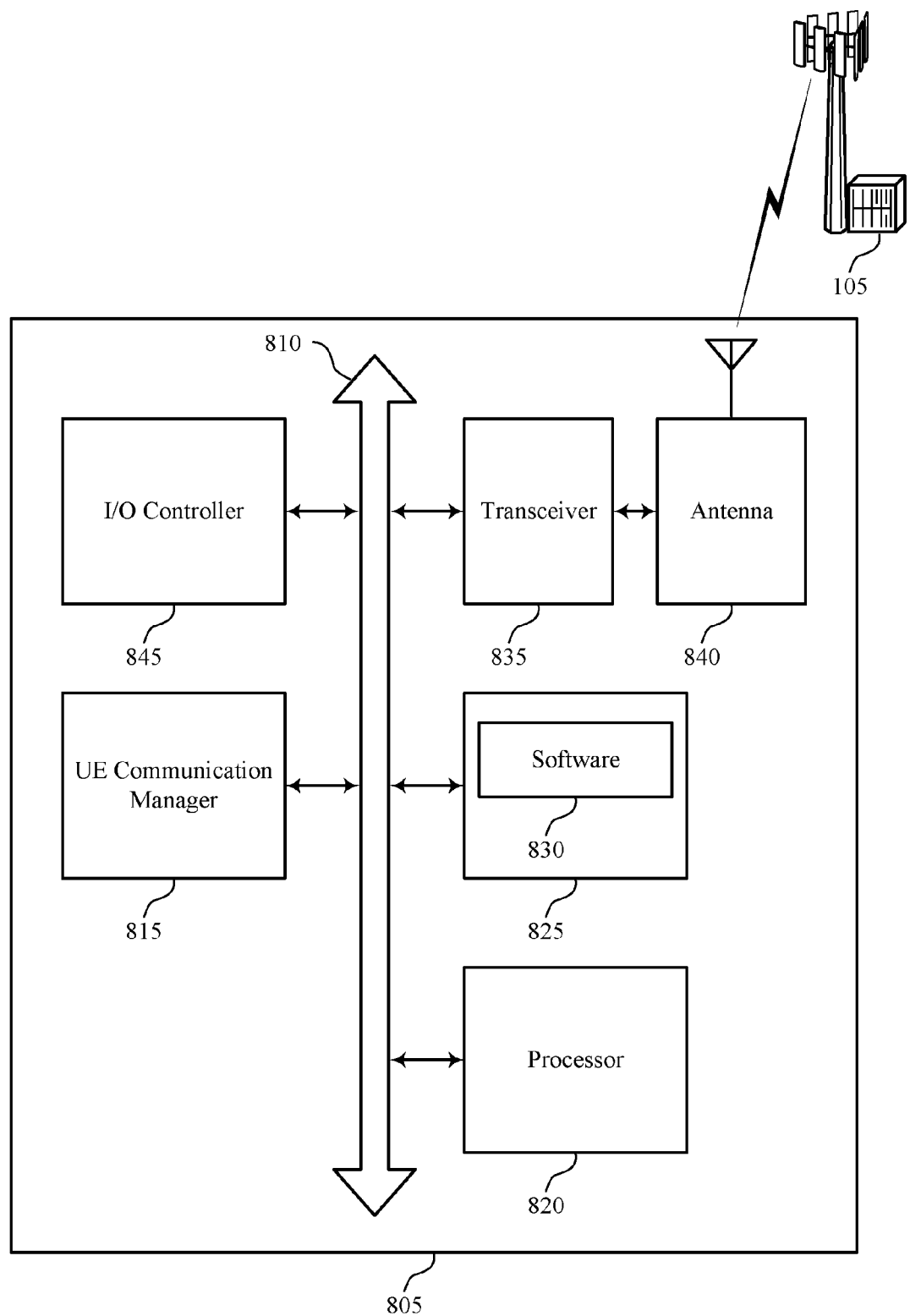
FIG. 8 illustrates a block diagram of a system including a user equipment (UE) that supports MiCr and autonomous uplink transmission in accordance with aspects of the present disclosure.

FIG. 8 shows a diagram of a system 800 including a device 805 that supports MiCr and autonomous uplink transmission in accordance with various aspects of the present disclosure. Device 805 may be an example of or include the components of wireless device 505, wireless device 605, or a UE 115 as described above, e.g., with reference to FIGS. 1, 2, 5 and 6. Device 805 may include components for bi-directional voice and data communications including components for transmitting and receiving communications, including UE communication manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting MiCr and autonomous uplink transmission).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support MiCr and autonomous uplink transmission. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
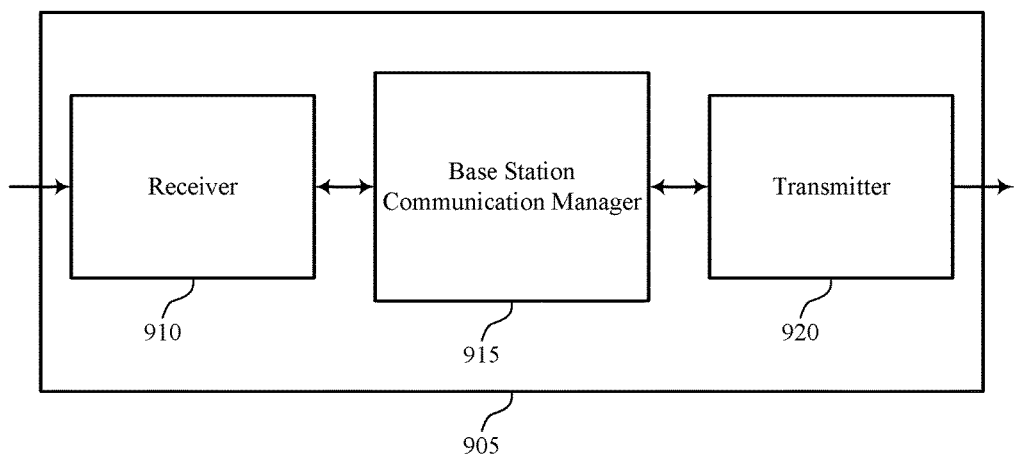
FIGS. 9 through 11 show block diagrams of a device that supports MiCr and autonomous uplink transmission in accordance with aspects of the present disclosure.

FIG. 9 shows a block diagram 900 of a wireless device 905 that supports MiCr and autonomous uplink transmission in accordance with various aspects of the present disclosure. Wireless device 905 may be an example of aspects of a base station 105 as described with reference to FIGS. 1 and 2. Wireless device 905 may include receiver 910, base station communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to or actual MiCr and autonomous uplink transmissions, etc.). Information may be passed on to other components of the device. The receiver 910 may be an example of aspects of the transceiver 1235 described with reference to FIG. 12.

Receiver 910 may receive an uplink message from the UE during the one or more sub-intervals of the second set, where the uplink message includes an autonomous uplink transmission or a MiCr uplink transmission. In some cases, receiving the uplink message further includes: receiving the uplink message during a sub-interval of the second set that is within an acquisition sub-interval of the frame, where the acquisition sub-interval also includes one or more sub-intervals for exclusive use by the network operating entity. In some cases, receiving the uplink message further includes: receiving the uplink message during a sub-interval of the second set that is included between an end boundary of a sub-interval for prioritized use by the network operating entity and a start boundary of a sub-interval for opportunistic use by the network operating entity.

Base station communication manager 915 may be an example of aspects of the base station communication manager 1215 described with reference to FIG. 12. Base station communication manager 915 may establish a wireless connection with a UE for communication using a shared RF spectrum band shared by a set of network operating entities; identify a frame including a first set of sub-intervals for exclusive use by a network operating entity, prioritized use by the network operating entity, or opportunistic use by the network operating entity; and identify, within the frame, a second set of sub-intervals different from the first set, the second set including reduced latency communication sub-intervals designated for use by the network operating entity for autonomous uplink transmissions, MiCr transmissions, or both.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
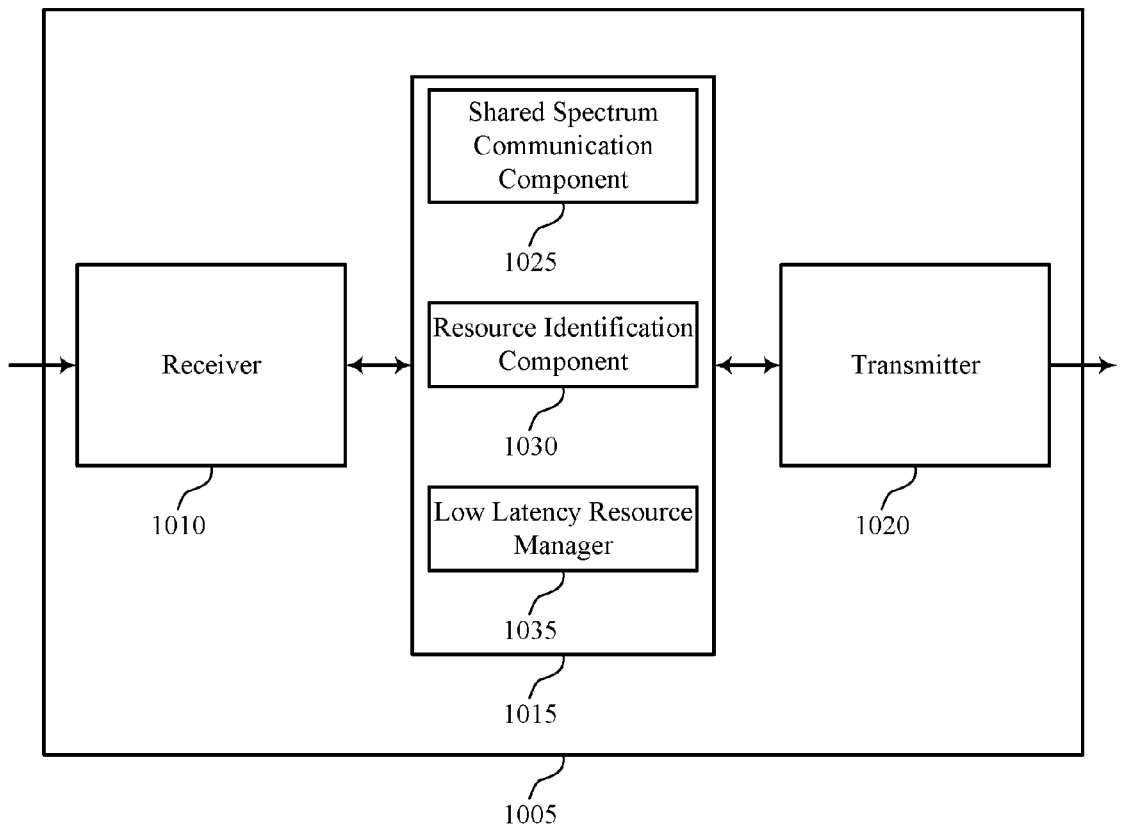

FIG. 10 shows a block diagram 1000 of a wireless device 1005 that supports MiCr and autonomous uplink transmission in accordance with various aspects of the present disclosure. Wireless device 1005 may be an example of aspects of a wireless device 905 or a base station 105 as described with reference to FIGS. 1, 2, and 9. Wireless device 1005 may include receiver 1010, base station communication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to and actual MiCr and autonomous uplink transmissions, etc.). Information may be passed on to other components of the device. The receiver 1010 may be an example of aspects of the transceiver 1235 described with reference to FIG. 12.

Base station communication manager 1015 may be an example of aspects of the base station communication manager 1215 described with reference to FIG. 12. Base station communication manager 1015 may also include shared spectrum communication component 1025, resource identification component 1030, and low latency resource manager 1035.

Shared spectrum communication component 1025 may establish a wireless connection with a UE for communication using a shared RF spectrum band shared by a set of network operating entities. Resource identification component 1030 may identify a frame including a first set of sub-intervals for exclusive use by a network operating entity, prioritized use by the network operating entity, or opportunistic use by the network operating entity.

Low latency resource manager 1035 may identify, within the frame, a second set of sub-intervals different from the first set, the second set including reduced latency communication sub-intervals designated for use by the network operating entity for autonomous uplink transmissions, MiCr uplink or downlink transmissions, or both. In some cases, the sub-intervals designated for autonomous uplink transmissions and the sub-intervals designated for MiCr transmissions are non-overlapping. In some cases, the second set of sub-intervals are for the exclusive use of the network operating entity.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
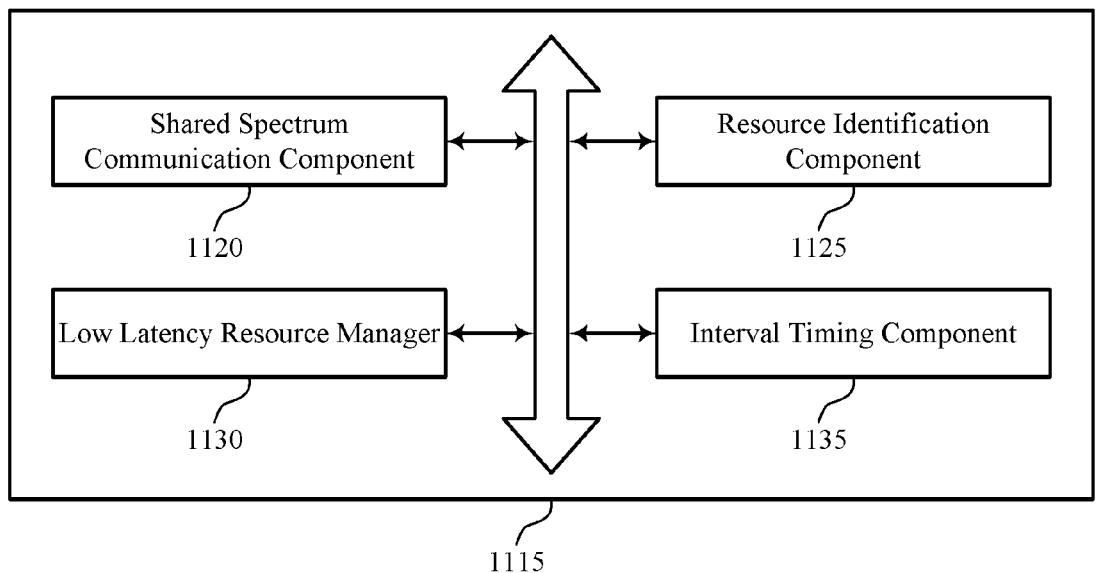

FIG. 11 shows a block diagram 1100 of a base station communication manager 1115 that supports MiCr and autonomous uplink transmission in accordance with various aspects of the present disclosure. The base station communication manager 1115 may be an example of aspects of a base station communication manager 915, a base station communication manager 1015, or a base station communication manager 1215 described with reference to FIGS. 9, 10, and 12. The base station communication manager 1115 may include shared spectrum communication component 1120, resource identification component 1125, low latency resource manager 1130, and interval timing component 1135. Each of these modules may communicate, directly or indirectly, with one another (e.g., via one or more buses).

Shared spectrum communication component 1120 may establish a wireless connection with a UE for communication using a shared RF spectrum band shared by a set of network operating entities. Resource identification component 1125 may identify a frame including a first set of sub-intervals for exclusive use by a network operating entity, prioritized use by the network operating entity, or opportunistic use by the network operating entity.

Low latency resource manager 1130 may identify, within the frame, a second set of sub-intervals different from the first set, the second set including reduced latency communication sub-intervals designated for use by the network operating entity for autonomous uplink transmissions, MiCr uplink or downlink transmissions, or both. In some cases, the sub-intervals designated for autonomous uplink transmissions and the sub-intervals designated for MiCr transmissions are non-overlapping. In some cases, the second set of sub-intervals are for the exclusive use of the network operating entity.

Interval timing component 1135 may transmit an indication of a timing of the second set of sub-intervals from the network operating entity. In some cases, the indication is transmitted during a sub-interval for exclusive use by the network operating entity. In some cases, a timing of the second set of sub-intervals is preconfigured based on an ID of the network operating entity.

Figure 12:
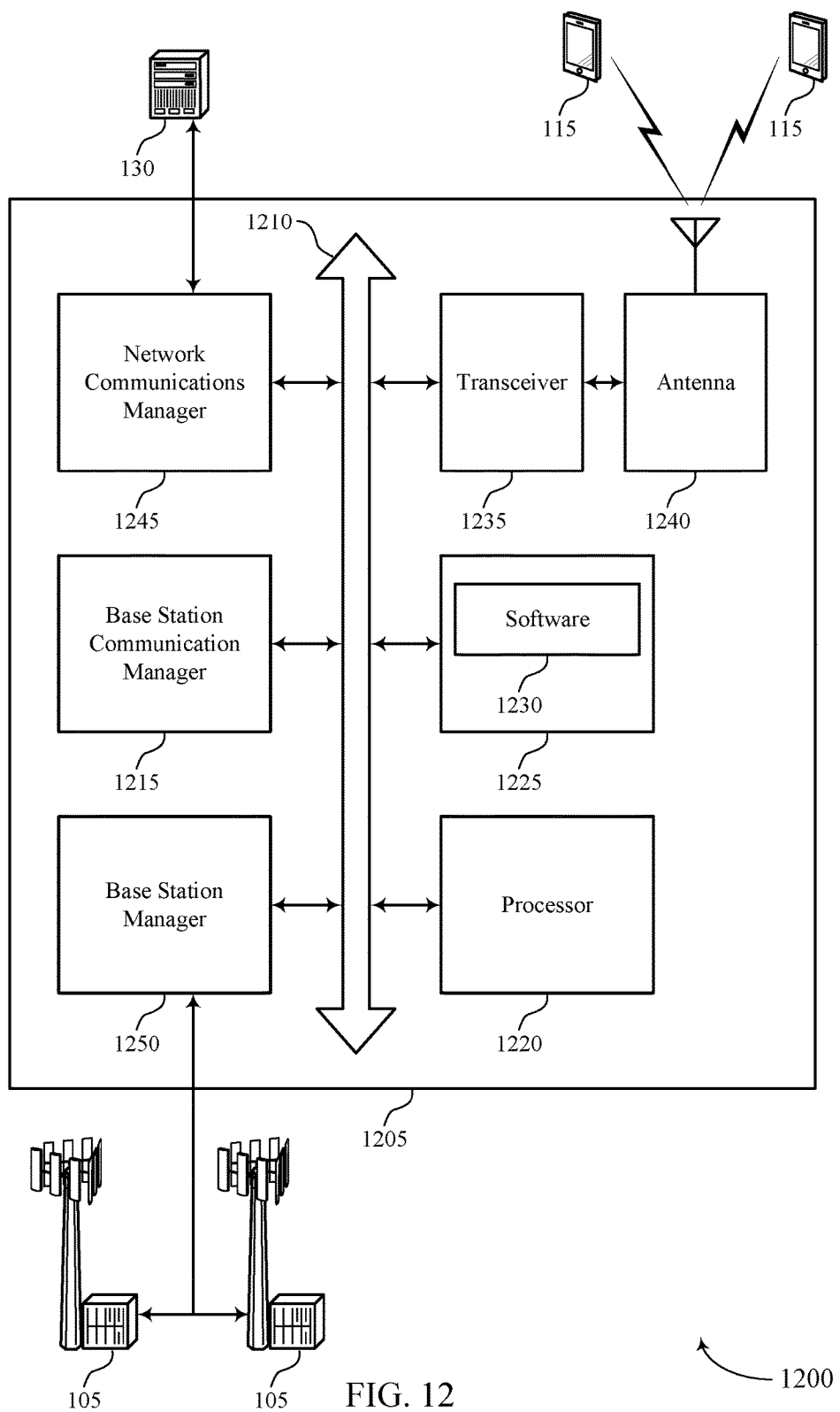
FIG. 12 illustrates a block diagram of a system including a base station that supports MiCr and autonomous uplink transmission in accordance with aspects of the present disclosure.

FIG. 12 shows a diagram of a system 1200 including a device 1205 that supports MiCr and autonomous uplink transmission in accordance with various aspects of the present disclosure. Device 1205 may be an example of or include the components of base station 105 as described above, e.g., with reference to FIGS. 1 and 2. Device 1205 may include components for bi-directional voice and data communications including components for transmitting and receiving communications, including base station communication manager 1215, processor 1220, memory 1225, software 1230, transceiver 1235, antenna 1240, network communications manager 1245, and base station manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting MiCr and autonomous uplink transmission).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support MiCr and autonomous uplink transmission. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network 130 (e.g., via one or more wired backhaul links). For example, the network communications manager 1245 may manage the transfer of data communications for client devices, such as one or more UEs 115.

Base station manager 1250 may manage communications with other base station 105, and may include a controller or scheduler for controlling communications with UEs 115 in cooperation with other base stations 105. For example, the base station manager 1250 may coordinate scheduling for transmissions to UEs 115 for various interference mitigation techniques such as beamforming or joint transmission. In some examples, base station manager 1250 may provide an X2 interface within an LTE/LTE-A wireless communication network technology to provide communication between base stations 105. Base station manager 1250 may provide other interfaces compatible with NR or other next-generation wireless communication network technology.

Figure 13:
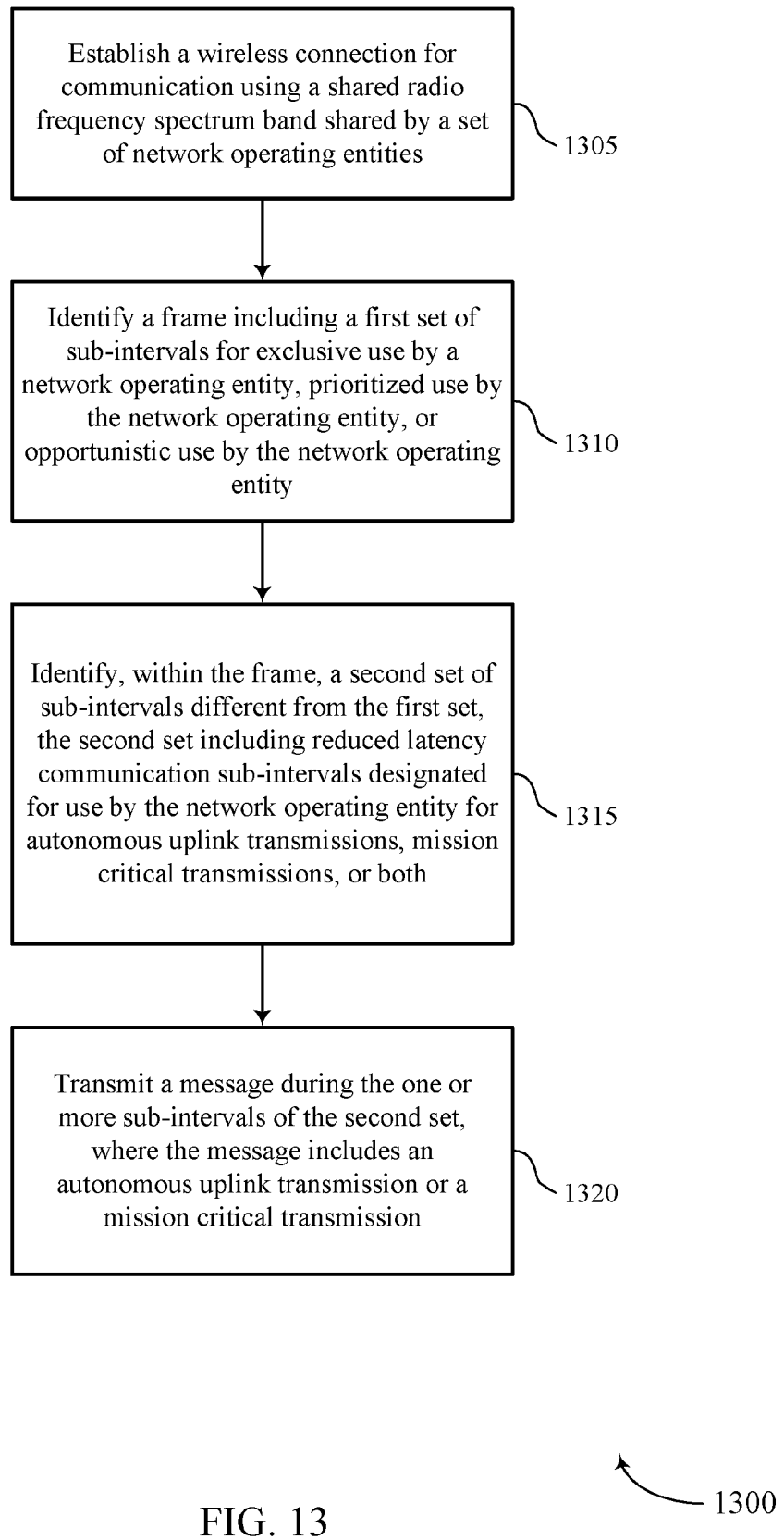
FIGS. 13 through 16 illustrate methods for MiCr and autonomous uplink transmission in accordance with aspects of the present disclosure.

FIG. 13 shows a flowchart illustrating a method 1300 for MiCr and autonomous uplink transmission in accordance with various aspects of the present disclosure. The operations of method 1300 may be implemented by a UE 115 or its components as described herein, as well as by a base station 105 or its components as described herein. For example, the operations of method 1300 may be performed by a UE communication manager as described with reference to FIGS. 5 through 8, or by a base station communication manager as described with reference to FIGS. 9 through 12. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may establish a wireless connection for communication using a shared RF spectrum band shared by a plurality of network operating entities. The operations of block 1305 may be performed according to the methods described with reference to FIGS. 1 through 4. In certain examples, aspects of the operations of block 1305 may be performed by a shared spectrum communication component as described with reference to FIGS. 5 through 12.

At block 1310 the UE 115 or base station 105 may identify a frame comprising a first plurality of sub-intervals for exclusive use by a network operating entity, prioritized use by the network operating entity, or opportunistic use by the network operating entity. The operations of block 1310 may be performed according to the methods described with reference to FIGS. 1 through 4. In certain examples, aspects of the operations of block 1310 may be performed by a resource identification component as described with reference to FIGS. 5 through 12.

At block 1315 the UE 115 or base station 105 may identify, within the frame, a second plurality of sub-intervals different from the first plurality, the second plurality comprising reduced latency communication sub-intervals designated for use by the network operating entity for autonomous uplink transmissions, MiCr transmissions, or both. The operations of block 1315 may be performed according to the methods described with reference to FIGS. 1 through 4. In certain examples, aspects of the operations of block 1315 may be performed by a low latency resource manager as described with reference to FIGS. 5 through 12.

At block 1320 the UE 115 or base station 105 may transmit a message during the one or more sub-intervals of the second plurality, wherein the message comprises an autonomous uplink transmission or a MiCr transmission. The operations of block 1320 may be performed according to the methods described with reference to FIGS. 1 through 4. In certain examples, aspects of the operations of block 1320 may be performed by an uplink/downlink component as described with reference to FIGS. 5 through 8 or by a transceiver as described with reference to FIGS. 8 and 12.

Figure 14:
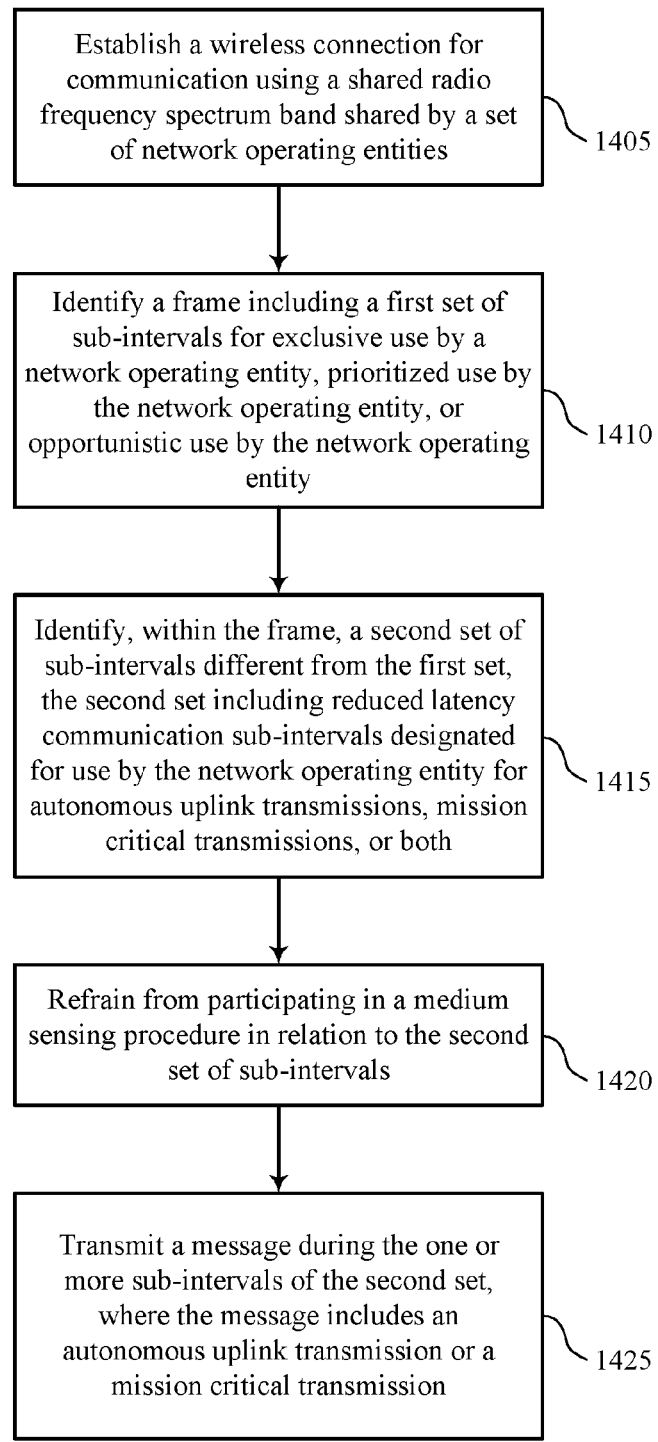

FIG. 14 shows a flowchart illustrating a method 1400 for MiCr and autonomous uplink transmission in accordance with various aspects of the present disclosure. The operations of method 1400 may be implemented by a UE 115 or its components as described herein, as well as by a base station 105 or its components as described herein. For example, the operations of method 1400 may be performed by a UE communication manager as described with reference to FIGS. 5 through 8, or by a base station communication manager as described with reference to FIGS. 9 through 12. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may establish a wireless connection for communication using a shared RF spectrum band shared by a plurality of network operating entities. The operations of block 1405 may be performed according to the methods described with reference to FIGS. 1 through 4. In certain examples, aspects of the operations of block 1405 may be performed by a shared spectrum communication component as described with reference to FIGS. 5 through 12.

At block 1410 the UE 115 or base station 105 may identify a frame comprising a first plurality of sub-intervals for exclusive use by a network operating entity, prioritized use by the network operating entity, or opportunistic use by the network operating entity. The operations of block 1410 may be performed according to the methods described with reference to FIGS. 1 through 4. In certain examples, aspects of the operations of block 1410 may be performed by a resource identification component as described with reference to FIGS. 5 through 12.

At block 1415 the UE 115 or base station 105 may identify, within the frame, a second plurality of sub-intervals different from the first plurality, the second plurality comprising reduced latency communication sub-intervals designated for use by the network operating entity for autonomous uplink transmissions, MiCr transmissions, or both. The operations of block 1415 may be performed according to the methods described with reference to FIGS. 1 through 4. In certain examples, aspects of the operations of block 1415 may be performed by a low latency resource manager as described with reference to FIGS. 5 through 12.

At block 1420 the UE 115 may refrain from participating in a medium sensing procedure in relation to the second plurality of sub-intervals. The operations of block 1420 may be performed according to the methods described with reference to FIGS. 1 through 4. In certain examples, aspects of the operations of block 1420 may be performed by a shared spectrum communication component as described with reference to FIGS. 5 through 12.

At block 1425 the UE 115 may transmit a message during the one or more sub-intervals of the second plurality, wherein the message comprises an autonomous uplink transmission or a MiCr transmission. The operations of block 1425 may be performed according to the methods described with reference to FIGS. 1 through 4. In certain examples, aspects of the operations of block 1425 may be performed by an uplink/downlink component as described with reference to FIGS. 5 through 8 or by a transceiver as described with reference to FIGS. 8 and 12.

Figure 15:
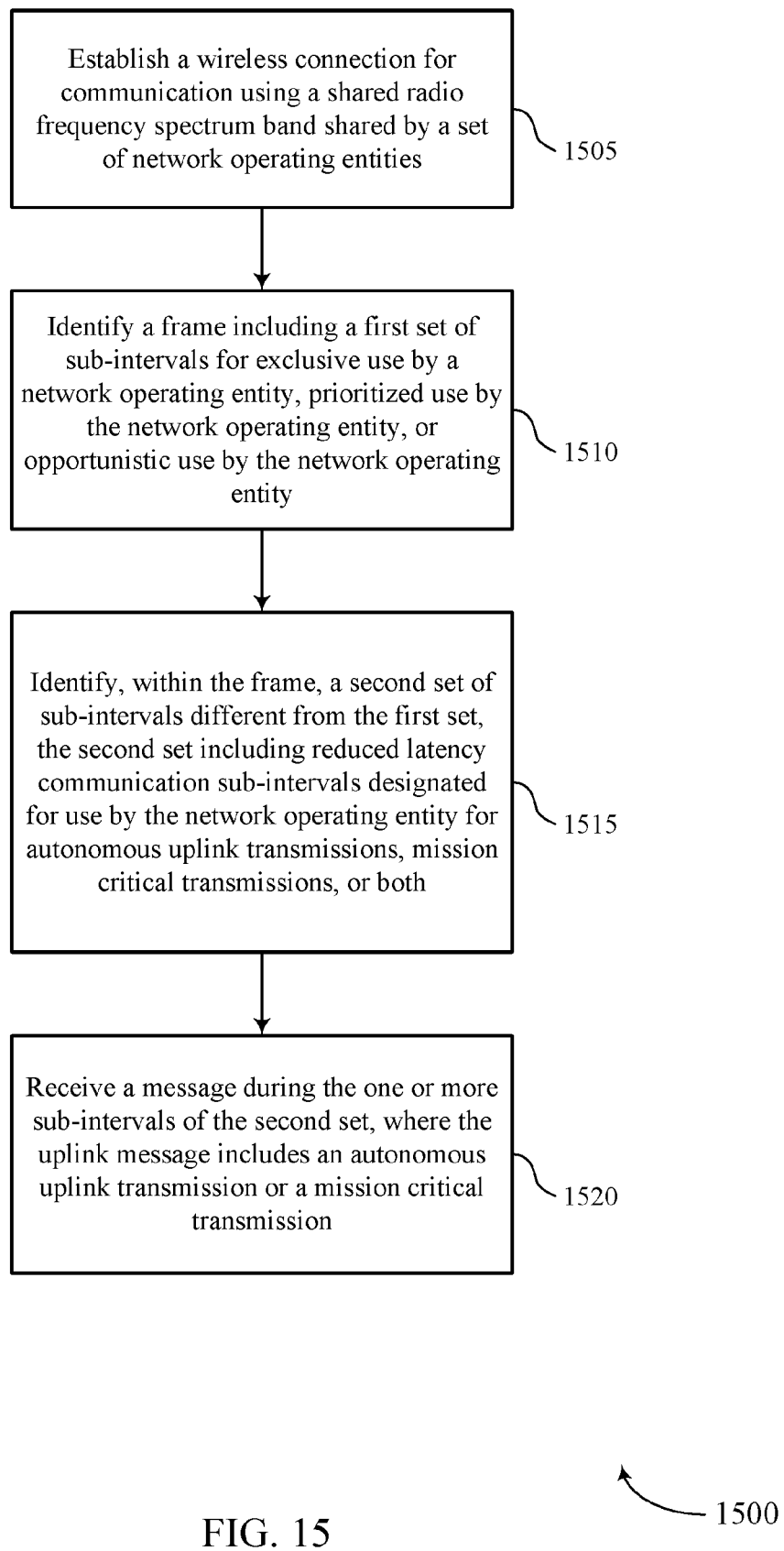

FIG. 15 shows a flowchart illustrating a method 1500 for MiCr and autonomous uplink transmission in accordance with various aspects of the present disclosure. The operations of method 1500 may be implemented by a base station 105 or its components as described herein, as well as by a UE 115 or its components as described herein. For example, the operations of method 1500 may be performed by a base station communication manager as described with reference to FIGS. 9 through 12, or by a UE communication manager as described with reference to FIGS. 5 through 8. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At block 1505 the base station 105 or UE 115 may establish a wireless connection for communication using a shared RF spectrum band shared by a plurality of network operating entities. The operations of block 1505 may be performed according to the methods described with reference to FIGS. 1 through 4. In certain examples, aspects of the operations of block 1505 may be performed by a shared spectrum communication component as described with reference to FIGS. 5 through 12.

At block 1510 the base station 105 or UE 115 may identify a frame comprising a first plurality of sub-intervals for exclusive use by a network operating entity, prioritized use by the network operating entity, or opportunistic use by the network operating entity. The operations of block 1510 may be performed according to the methods described with reference to FIGS. 1 through 4. In certain examples, aspects of the operations of block 1510 may be performed by a resource identification component as described with reference to FIGS. 5 through 12.

At block 1515 the base station 105 or UE 115 may identify, within the frame, a second plurality of sub-intervals different from the first plurality, the second plurality comprising reduced latency communication sub-intervals designated for use by the network operating entity for autonomous uplink transmissions, MiCr transmissions, or both. The operations of block 1515 may be performed according to the methods described with reference to FIGS. 1 through 4. In certain examples, aspects of the operations of block 1515 may be performed by a low latency resource manager as described with reference to FIGS. 5 through 12.

At block 1520 the base station 105 or UE 115 may receive a message during the one or more sub-intervals of the second plurality, wherein the message comprises an autonomous uplink transmission or a MiCr transmission. The operations of block 1520 may be performed according to the methods described with reference to FIGS. 1 through 4. In certain examples, aspects of the operations of block 1520 may be performed by a receiver as described with reference to FIGS. 5 through 12.

Figure 16:
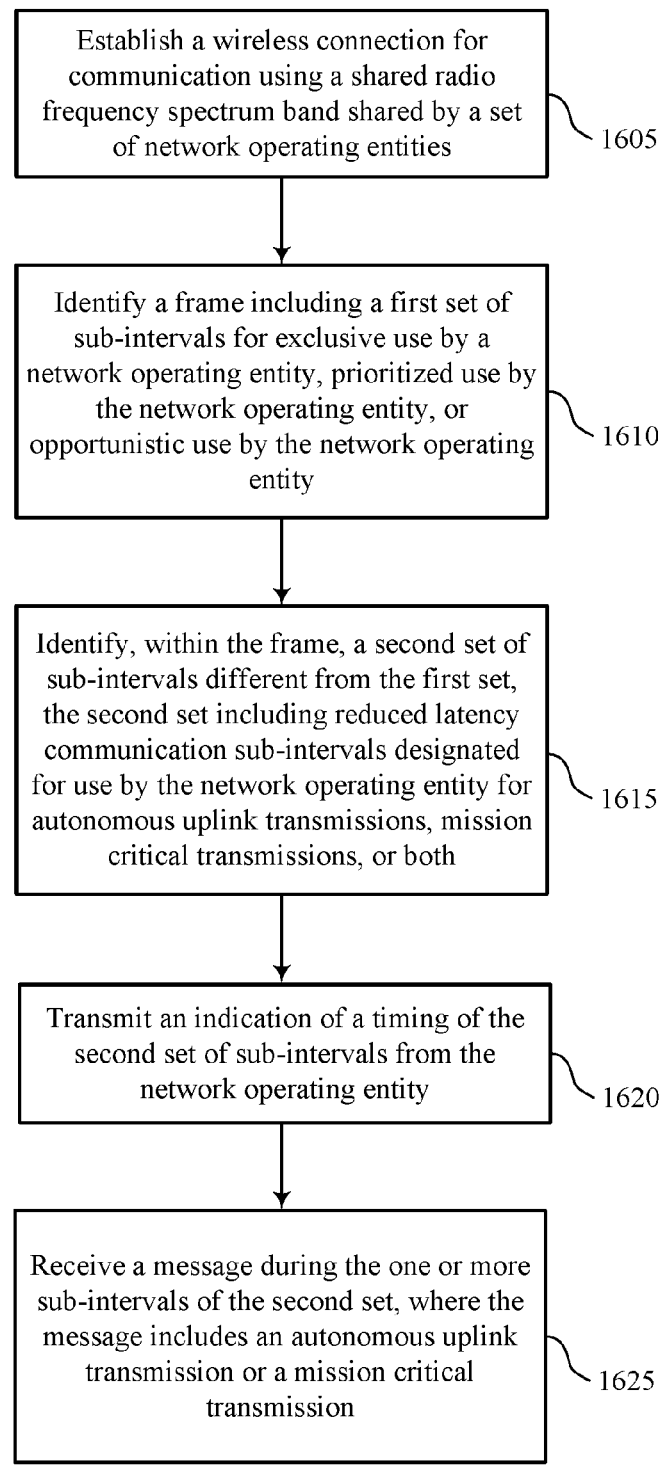

FIG. 16 shows a flowchart illustrating a method 1600 for MiCr and autonomous uplink transmission in accordance with various aspects of the present disclosure. The operations of method 1600 may be implemented by a base station 105 or its components as described herein. For example, the operations of method 1600 may be performed by a base station communication manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may establish a wireless connection for communication using a shared RF spectrum band shared by a plurality of network operating entities. The operations of block 1605 may be performed according to the methods described with reference to FIGS. 1 through 4. In certain examples, aspects of the operations of block 1605 may be performed by a shared spectrum communication component as described with reference to FIGS. 9 through 12.

At block 1610 the base station 105 may identify a frame comprising a first plurality of sub-intervals for exclusive use by a network operating entity, prioritized use by the network operating entity, or opportunistic use by the network operating entity. The operations of block 1610 may be performed according to the methods described with reference to FIGS. 1 through 4. In certain examples, aspects of the operations of block 1610 may be performed by a resource identification component as described with reference to FIGS. 9 through 12.

At block 1615 the base station 105 may identify, within the frame, a second plurality of sub-intervals different from the first plurality, the second plurality comprising reduced latency communication sub-intervals designated for use by the network operating entity for autonomous uplink transmissions, MiCr transmissions, or both. The operations of block 1615 may be performed according to the methods described with reference to FIGS. 1 through 4. In certain examples, aspects of the operations of block 1615 may be performed by a low latency resource manager as described with reference to FIGS. 5 through 12.

At block 1620 the base station 105 may transmit an indication of a timing of the second plurality of sub-intervals from the network operating entity. The operations of block 1620 may be performed according to the methods described with reference to FIGS. 1 through 4. In certain examples, aspects of the operations of block 1620 may be performed by an interval timing component as described with reference to FIGS. 9 through 12.

At block 1625 the base station 105 may receive a message from the UE during the one or more sub-intervals of the second plurality, wherein the message comprises an autonomous uplink transmission or a MiCr transmission. The operations of block 1625 may be performed according to the methods described with reference to FIGS. 1 through 4. In certain examples, aspects of the operations of block 1625 may be performed by a receiver as described with reference to FIGS. 9 through 12.

It should be noted that the methods described above describe possible implementations, and that the operations and the steps may be rearranged or otherwise modified and that other implementations are possible. Furthermore, aspects from two or more of the methods 1300, 1400, 1500, or 1600 described with reference to FIG. 13, 14, 15, or 16 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, a next generation NodeB (gNB), or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a wireless connection for communication using a shared radio frequency spectrum band shared by a plurality of network operating entities;
   identifying a frame comprising a first plurality of sub-intervals for exclusive use by a network operating entity, prioritized use by the network operating entity, or opportunistic use by the network operating entity, or some combination thereof;
   identifying, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
   transmitting a message during the one or more sub-intervals of the second plurality of sub-intervals, wherein the message comprises, at least in part, an autonomous uplink transmission or a mission critical transmission.

2. The method of claim 1, further comprising:
   receiving an indication of a timing of the second plurality of sub-intervals from the network operating entity.

3. The method of claim 2, wherein
   the indication is received during a sub-interval for exclusive use by the network operating entity.

4. The method of claim 1, wherein
   a timing of the second plurality of sub-intervals is pre-configured based at least in part on an identification (ID) of the network operating entity.

5. The method of claim 1, wherein
   transmitting the message further comprises: transmitting the message during a sub-interval of the second plurality of sub-intervals that is within an acquisition sub-interval of the frame, wherein the acquisition sub-interval comprises one or more sub-intervals for exclusive use by the network operating entity.

6. The method of claim 1, wherein
   transmitting the message further comprises: transmitting the message during a sub-interval of the second plurality of sub-intervals between an end boundary of a sub-interval for prioritized use by the network operating entity and a start boundary of a sub-interval for opportunistic use by the network operating entity.

7. The method of claim 1, wherein
   the sub-intervals designated for autonomous uplink transmissions and the sub-intervals designated for mission critical transmissions are non-overlapping.

8. The method of claim 1, wherein the second plurality of sub-intervals are for the exclusive use of the network operating entity.

9. The method of claim 1, further comprising:
refraining from participating in a medium sensing procedure in relation to the second plurality of sub-intervals prior to transmission of the message.

10. The method of claim 1, wherein transmitting the message further comprises: transmitting a mission critical uplink transmission.

11. The method of claim 1, wherein the reduced latency communication sub-intervals designated for use by the network operating entity for mission critical transmissions are contention-free.

12. The method of claim 1, wherein the reduced latency communication sub-intervals designated for use by the network operating entity for autonomous uplink transmissions are used with a contention procedure.

13. The method of claim 1, wherein the second plurality of sub-intervals for the network operating entity outnumber the first plurality of sub-intervals for the network operating entity in the frame.

14. A method for wireless communication, comprising:
establishing a wireless connection for communication using a shared radio frequency spectrum band shared by a plurality of network operating entities;
identifying a frame comprising a first plurality of sub-intervals for exclusive use by a network operating entity, prioritized use by the network operating entity, or opportunistic use by the network operating entity, or some combination thereof;
identifying, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
receiving a message during the one or more sub-intervals of the second plurality of sub-intervals, wherein the message comprises, at least in part, an autonomous uplink transmission or a mission critical transmission.

15. The method of claim 14, further comprising:
transmitting an indication of a timing of the second plurality of sub-intervals from the network operating entity.

16. The method of claim 15, wherein the indication is transmitted during a sub-interval for exclusive use by the network operating entity.

17. The method of claim 14, wherein a timing of the second plurality of sub-intervals is preconfigured based at least in part on an identification (ID) of the network operating entity.

18. The method of claim 14, wherein receiving the message further comprises: receiving the message during a sub-interval of the second plurality of sub-intervals that is within an acquisition sub-interval of the frame, wherein the acquisition sub-interval comprises one or more sub-intervals for exclusive use by the network operating entity.

19. The method of claim 14, wherein receiving the message further comprises: receiving the message during a sub-interval of the second plurality of sub-intervals between an end boundary of a sub-interval for prioritized use by the network operating entity and a start boundary of a sub-interval for opportunistic use by the network operating entity.

20. The method of claim 14, wherein the sub-intervals designated for autonomous uplink transmissions and the sub-intervals designated for mission critical transmissions are non-overlapping.

21. The method of claim 14, wherein the second plurality of sub-intervals are for the exclusive use of the network operating entity.

22. The method of claim 14, wherein receiving the message further comprises: receiving a mission critical uplink transmission.

23. The method of claim 14, wherein the reduced latency communication sub-intervals designated for use by the network operating entity for mission critical transmissions are contention-free.

24. The method of claim 14, wherein the reduced latency communication sub-intervals designated for use by the network operating entity for autonomous uplink transmissions are used with a contention procedure.

25. The method of claim 14, wherein the second plurality of sub-intervals for the network operating entity outnumber the first plurality of sub-intervals for the network operating entity in the frame.

26. An apparatus for wireless communication, in a system comprising:
a processor;
memory in electronic communication with the processor; and
instructions stored in the memory and operable, when executed by the processor, to cause the apparatus to:
establish a wireless connection for communication using a shared radio frequency spectrum band shared by a plurality of network operating entities;
identify a frame comprising a first plurality of sub-intervals for exclusive use by a network operating entity, prioritized use by the network operating entity, or opportunistic use by the network operating entity, or some combination thereof;
identify, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
transmit a message during the one or more sub-intervals of the second plurality of sub-intervals, wherein the message comprises, at least in part, an autonomous uplink transmission or a mission critical transmission.

27. The apparatus of claim 26, wherein the instructions are further executable by the processor to cause the apparatus to:
receive an indication of a timing of the second plurality of sub-intervals from the network operating entity.

28. An apparatus for wireless communication, in a system comprising:
a processor;
memory in electronic communication with the processor; and
instructions stored in the memory and operable, when executed by the processor, to cause the apparatus to:
establish a wireless connection for communication using a shared radio frequency spectrum band shared by a plurality of network operating entities;
identify a frame comprising a first plurality of sub-intervals for exclusive use by a network operating entity, prioritized use by the network operating entity, or opportunistic use by the network operating entity, or some combination thereof;

identify, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and receive a message during the one or more sub-intervals of the second plurality of sub-intervals, wherein the message comprises, at least in part, an autonomous uplink transmission or a mission critical transmission.

29. An apparatus for wireless communication, comprising:
means for establishing a wireless connection for communication using a shared radio frequency spectrum band shared by a plurality of network operating entities;
means for identifying a frame comprising a first plurality of sub-intervals for exclusive use by a network operating entity, prioritized use by the network operating entity, or opportunistic use by the network operating entity, or some combination thereof;
means for identifying, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
means for transmitting a message during the one or more sub-intervals of the second plurality of sub-intervals, wherein the message comprises, at least in part, an autonomous uplink transmission or a mission critical transmission.

30. An apparatus for wireless communication, comprising:
means for establishing a wireless connection for communication using a shared radio frequency spectrum band shared by a plurality of network operating entities;
means for identifying a frame comprising a first plurality of sub-intervals for exclusive use by a network operating entity, prioritized use by the network operating entity, or opportunistic use by the network operating entity, or some combination thereof;
means for identifying, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
means for receiving a message during the one or more sub-intervals of the second plurality of sub-intervals, wherein the message comprises, at least in part, an autonomous uplink transmission or a mission critical transmission.

31. A non-transitory computer-readable medium storing computer-executable code for wireless communication, the code comprising instructions, wherein the instructions, when executed by a processor, cause the processor to:
establish a wireless connection for communication using a shared radio frequency spectrum band shared by a plurality of network operating entities;
identify a frame comprising a first plurality of sub-intervals for exclusive use by a network operating entity, prioritized use by the network operating entity, or opportunistic use by the network operating entity, or some combination thereof;
identify, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
transmit a message during the one or more sub-intervals of the second plurality of sub-intervals, wherein the message comprises, at least in part, an autonomous uplink transmission or a mission critical transmission.

32. A non-transitory computer-readable medium storing computer-executable code for wireless communication, the code comprising instructions, wherein the instructions, when executed by a processor, cause the processor to:
establish a wireless connection for communication using a shared radio frequency spectrum band shared by a plurality of network operating entities;
identify a frame comprising a first plurality of sub-intervals for exclusive use by a network operating entity, prioritized use by the network operating entity, or opportunistic use by the network operating entity, or some combination thereof;
identify, within the frame, a second plurality of sub-intervals different from the first plurality, the second plurality of sub-intervals comprising reduced latency communication sub-intervals designated for use by the network operating entity for autonomous uplink transmissions, mission critical transmissions, or both; and
receive a message during the one or more sub-intervals of the second plurality of sub-intervals, wherein the message comprises, at least in part, an autonomous uplink transmission or a mission critical transmission.

* * * * *